United States Patent
Atta et al.

(10) Patent No.: US 10,963,001 B1
(45) Date of Patent: Mar. 30, 2021

(54) CLIENT CONFIGURABLE HARDWARE LOGIC AND CORRESPONDING HARDWARE CLOCK METADATA

(71) Applicant: Amazon Technologies, Inc., Seattle, WA (US)

(72) Inventors: Islam Mohamed Hatem Abdulfattah Mohamed Atta, Vancouver (CA); Robert Michael Johnson, Austin, TX (US); Nafea Bshara, San Jose, CA (US); Asif Khan, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 139 days.

(21) Appl. No.: 15/669,810

(22) Filed: Aug. 4, 2017

Related U.S. Application Data

(60) Provisional application No. 62/486,907, filed on Apr. 18, 2017.

(51) Int. Cl.
| | |
|---|---|
| *G06F 1/08* | (2006.01) |
| *G06F 1/12* | (2006.01) |
| *H04L 29/08* | (2006.01) |
| *G06F 9/455* | (2018.01) |

(52) U.S. Cl.
CPC ............... *G06F 1/08* (2013.01); *G06F 1/12* (2013.01); *H04L 67/101* (2013.01); *H04L 67/34* (2013.01); *G06F 2009/45595* (2013.01)

(58) Field of Classification Search
CPC .... G06F 17/5054; G06F 21/76; G06F 17/505; G06F 17/5027; G06F 17/5045; G06F 15/7871; G06F 15/7867

USPC .......... 716/113, 104, 102, 117, 134; 326/39; 713/100, 600; 710/104, 305
See application file for complete search history.

(56) References Cited

U.S. PATENT DOCUMENTS

| | | | | |
|---|---|---|---|---|
| 5,475,830 | A | * 12/1995 | Chen ....................... | A21B 1/245 716/108 |
| 5,497,281 | A | 3/1996 | Jewell et al. | |
| 5,933,642 | A | * 8/1999 | Greenbaum ............ | G06F 8/447 712/1 |
| 5,948,089 | A | * 9/1999 | Wingard ................. | G06F 13/37 710/107 |
| 6,531,926 | B1 | * 3/2003 | Pate ....................... | H03L 7/093 331/10 |
| 6,606,670 | B1 | * 8/2003 | Stoneking ............... | G06F 8/654 710/14 |
| 6,625,796 | B1 | * 9/2003 | Rangasayee ............ | G06F 30/34 326/38 |
| 6,690,224 | B1 | * 2/2004 | Moore ..................... | G06F 1/06 327/162 |

(Continued)

OTHER PUBLICATIONS

"Programmable Logic Device", "Shell", Microsoft Computer Dictionary, 5th edition, 2002, pp. 524 & 478.

(Continued)

*Primary Examiner* — Faisal M Zaman
(74) *Attorney, Agent, or Firm* — Kilpatrick Townsend & Stockton LLP

(57) ABSTRACT

Disclosed are techniques regarding aspects of implementing client configurable logic within a computer system. The computer system can be a cloud infrastructure. The techniques can include associating clock information with the client configurable logic for various purposes.

30 Claims, 11 Drawing Sheets

(56) References Cited

U.S. PATENT DOCUMENTS

| | | | |
|---|---|---|---|
| 6,732,347 B1* | 5/2004 | Camilleri | G06F 1/10 |
| | | | 716/117 |
| 6,971,004 B1* | 11/2005 | Pleis | G06F 15/7867 |
| | | | 326/38 |
| 7,000,161 B1 | 2/2006 | Allen et al. | |
| 7,017,043 B1 | 3/2006 | Potkonjak | |
| 7,139,820 B1 | 11/2006 | O'Toole, Jr. et al. | |
| 7,149,913 B2* | 12/2006 | Barr | G06F 1/08 |
| | | | 713/500 |
| 7,269,750 B1* | 9/2007 | Garritsen | G06F 1/3203 |
| | | | 713/322 |
| 7,278,128 B1 | 10/2007 | Trimberger | |
| 7,330,924 B1* | 2/2008 | Kao | H04L 12/56 |
| | | | 370/248 |
| 7,478,255 B2* | 1/2009 | Campbell | G06F 1/10 |
| | | | 713/400 |
| 7,759,968 B1 | 7/2010 | Hussein et al. | |
| 7,805,766 B2 | 9/2010 | Christensen et al. | |
| 7,919,979 B1* | 4/2011 | Mason | G06F 17/5027 |
| | | | 326/16 |
| 7,948,792 B1* | 5/2011 | Lee | G11C 11/413 |
| | | | 326/40 |
| 8,022,724 B1 | 9/2011 | Jenkins, IV | |
| 8,224,638 B1 | 7/2012 | Shirazi et al. | |
| 8,305,903 B1 | 11/2012 | Louise et al. | |
| 8,407,773 B1 | 3/2013 | Hayter et al. | |
| 8,645,702 B2 | 2/2014 | Zhang et al. | |
| 9,165,143 B1 | 10/2015 | Sanders et al. | |
| 9,218,505 B1 | 12/2015 | Wesselkamper et al. | |
| 9,305,185 B1 | 4/2016 | Pedersen | |
| 9,424,012 B1 | 8/2016 | Frazier et al. | |
| 9,548,740 B1* | 1/2017 | Chen | H03K 19/17748 |
| 9,760,731 B2 | 9/2017 | Winslow et al. | |
| 9,947,236 B2 | 4/2018 | Romney et al. | |
| 10,203,967 B1* | 2/2019 | Atta | G06F 9/44505 |
| 2002/0172229 A1* | 11/2002 | Parvin | H03L 7/00 |
| | | | 370/521 |
| 2002/0194108 A1 | 12/2002 | Kitze | |
| 2002/0199110 A1 | 12/2002 | Kean | |
| 2003/0061287 A1 | 3/2003 | Yu et al. | |
| 2003/0097628 A1 | 5/2003 | Ngo et al. | |
| 2003/0123659 A1 | 7/2003 | Forstrom et al. | |
| 2004/0153648 A1 | 8/2004 | Rotholtz et al. | |
| 2004/0170070 A1* | 9/2004 | Rapp | G06Q 40/08 |
| | | | 365/200 |
| 2004/0230771 A1* | 11/2004 | Borgatti | G11C 16/30 |
| | | | 712/34 |
| 2005/0235153 A1 | 10/2005 | Ikeda | |
| 2005/0268125 A1* | 12/2005 | Ohneda | G06F 1/3203 |
| | | | 713/300 |
| 2006/0291693 A1 | 12/2006 | Olson et al. | |
| 2007/0183493 A1 | 8/2007 | Kimpe | |
| 2007/0292002 A1 | 12/2007 | Kaplan | |
| 2008/0051075 A1 | 2/2008 | Einloth et al. | |
| 2008/0082854 A1* | 4/2008 | Ho | G06F 1/08 |
| | | | 713/500 |
| 2008/0191733 A1* | 8/2008 | Redgrave | H03K 19/1731 |
| | | | 326/9 |
| 2009/0201380 A1 | 8/2009 | Peaslee et al. | |
| 2010/0022339 A1 | 1/2010 | Barve | |
| 2010/0097149 A1* | 4/2010 | Yeung | G06F 1/12 |
| | | | 331/18 |
| 2010/0125739 A1 | 5/2010 | Creary et al. | |
| 2010/0134198 A1* | 6/2010 | Demharter | H03C 1/02 |
| | | | 332/149 |
| 2010/0192003 A1 | 7/2010 | Weizeorick | G06F 1/14 |
| | | | 713/500 |
| 2010/0199119 A1* | 8/2010 | Sun | G06F 1/08 |
| | | | 713/500 |
| 2010/0228887 A1 | 9/2010 | Koike | |
| 2011/0004549 A1 | 1/2011 | Gray et al. | |
| 2011/0026761 A1 | 2/2011 | Radhakrishnan et al. | |
| 2011/0031999 A1* | 2/2011 | Beat | H03K 19/17752 |
| | | | 326/38 |
| 2011/0078284 A1 | 3/2011 | Bomel et al. | |
| 2011/0088096 A1 | 4/2011 | Hilton | |
| 2011/0126004 A1 | 5/2011 | Kawana | |
| 2013/0021058 A1* | 1/2013 | Huang | G06F 30/34 |
| | | | 326/38 |
| 2013/0047005 A1* | 2/2013 | Lee | G06F 1/3287 |
| | | | 713/300 |
| 2013/0145367 A1 | 6/2013 | Moss et al. | |
| 2013/0198763 A1 | 8/2013 | Kunze et al. | |
| 2013/0318240 A1 | 11/2013 | Hebert et al. | |
| 2014/0275844 A1 | 9/2014 | Hoseit et al. | |
| 2014/0327460 A1 | 11/2014 | Zhou et al. | |
| 2014/0344581 A1 | 11/2014 | Grieco et al. | |
| 2015/0128268 A1* | 5/2015 | Fine | H04L 63/1441 |
| | | | 726/23 |
| 2015/0169489 A1 | 6/2015 | Edvenson et al. | |
| 2015/0363576 A1 | 12/2015 | Medvinsky et al. | |
| 2015/0378388 A1* | 12/2015 | Franch | G06F 1/08 |
| | | | 327/293 |
| 2016/0036447 A1* | 2/2016 | Sato | G06F 30/34 |
| | | | 326/38 |
| 2016/0117594 A1 | 4/2016 | Perez Ramos et al. | |
| 2016/0226491 A1* | 8/2016 | Chan | H03K 19/017581 |
| 2016/0277308 A1* | 9/2016 | Challa | H04L 67/42 |
| 2016/0309005 A1 | 10/2016 | Kim et al. | |
| 2017/0090536 A1* | 3/2017 | Schreiner | G06F 1/08 |
| 2017/0153660 A1* | 6/2017 | Chou | G06F 1/12 |
| 2017/0177396 A1 | 6/2017 | Palermo et al. | |
| 2017/0185434 A1 | 6/2017 | Sarangdhar et al. | |
| 2017/0188051 A1 | 6/2017 | Amer et al. | |
| 2017/0195173 A1 | 7/2017 | Izenberg et al. | |
| 2017/0250802 A1* | 8/2017 | Shimizu | G06F 9/45558 |
| 2018/0063139 A1 | 3/2018 | Day et al. | |
| 2018/0082083 A1 | 3/2018 | Smith et al. | |
| 2018/0095670 A1 | 4/2018 | Davis et al. | |
| 2018/0095774 A1 | 4/2018 | Atta et al. | |
| 2018/0157286 A1* | 6/2018 | Quiet | G06F 1/08 |
| 2018/0275193 A1 | 9/2018 | Rouge et al. | |
| 2019/0014531 A1 | 1/2019 | Fang et al. | |
| 2019/0028112 A1* | 1/2019 | Kadri | G06F 1/04 |

OTHER PUBLICATIONS

"Electronic Circuit", Wikipedia, Available online at https://en.wikipedia.org/wiki/Electronic_circuit, 2019, 1 page.

Becker et al., "Field-Programmable Logic and Applications", 2004, 1230 pages.

Bemalkhedkar, "An Object Oriented Framework for Bitstream Generation for Multi-Technology FPGA Chips", University of Cincinnati, Engineering: Computer Science, Available online at http://rave.ohiolink.edu/etdc/view?acc_num=ucin1113403362, Apr. 2005, 84 pages.

Kahng et al., "Watermarking Techniques for Intellectual Property Protection", Proceedings 1998 Design and Automation Conference. 35th DAC. (Cat. No. 98CH36175), 1998, pp. 776-781.

Marolia, "Watermarking FPGA Bitstream for IP Protection", Georgia Institute of Technology, Available online at https://smartech.gatech.edu/bitstream/handle/1853/24804/Marolia_Pratik_M_200808_mast.pdf, Aug. 2008, 54 pages.

Zhang et al., "A Survey on Security and Trust of FPGA-based Systems", 2014 International Conference on Field-Programmable Technology (FPT), 2014, pp. 147-152.

Ziener et al., "Power Signature Watermarking of IP Cores for FPGAs", Journal of Signal Processing Systems, vol. 51, No. 1, Apr. 2008, pp. 123-136.

U.S. Appl. No. 15/669,806, filed Aug. 4, 2017, Titled: Client Configurable Hardware Logic and Corresponding Data.

U.S. Appl. No. 15/669,808, filed Aug. 4, 2017, Titled: Client Configurable Hardware Logic and Corresponding Signature.

(56) References Cited

OTHER PUBLICATIONS

U.S. Appl. No. 15/669,813, filed Aug. 4, 2017, Titled: Client Configurable Hardware Logic and Identifier Interception.
"Implement", Merriam-Webster, 2020, 1 page.

* cited by examiner

CLIENT CONFIGURABLE HARDWARE LOGIC AND CORRESPONDING HARDWARE CLOCK METADATA

BACKGROUND

Cloud computing techniques can include use of networked computing resources of a cloud infrastructure to be made available for use by clients of a cloud services provider. Clients can access the networked computing resources via a network, such as the internet, to configure the networked computing resources to provide a service or to access a service provided by another client. Cloud service providers may receive monetary compensation from clients in exchange for access to or use of the networked computing resources. Cloud computing techniques can facilitate more efficient use of networked computing resources by, for example, enabling the resources to be allocated as needed between clients (e.g., for clients to scale services operating on cloud computing resources or to prototype new cloud enabled services) and/or by allocating hardware sequentially to service several clients.

Clients of cloud services may have diverse computing requirements resulting from different use cases. A cloud service provider can include various different computer systems having different types of components with varying levels of performance and/or functionality. Thus, a client can select a computer system that is potentially more efficient at executing a particular task. For example, the cloud service provider can provide systems with varying combinations of processing performance, memory performance, storage capacity or performance, and networking capacity or performance. However, some clients may desire to use hardware that is proprietary or highly specialized for executing their computing tasks.

BRIEF DESCRIPTION OF THE DRAWINGS

Various embodiments in accordance with the present disclosure will be described with reference to the drawings, in which.

DETAILED DESCRIPTION

Figure 1:
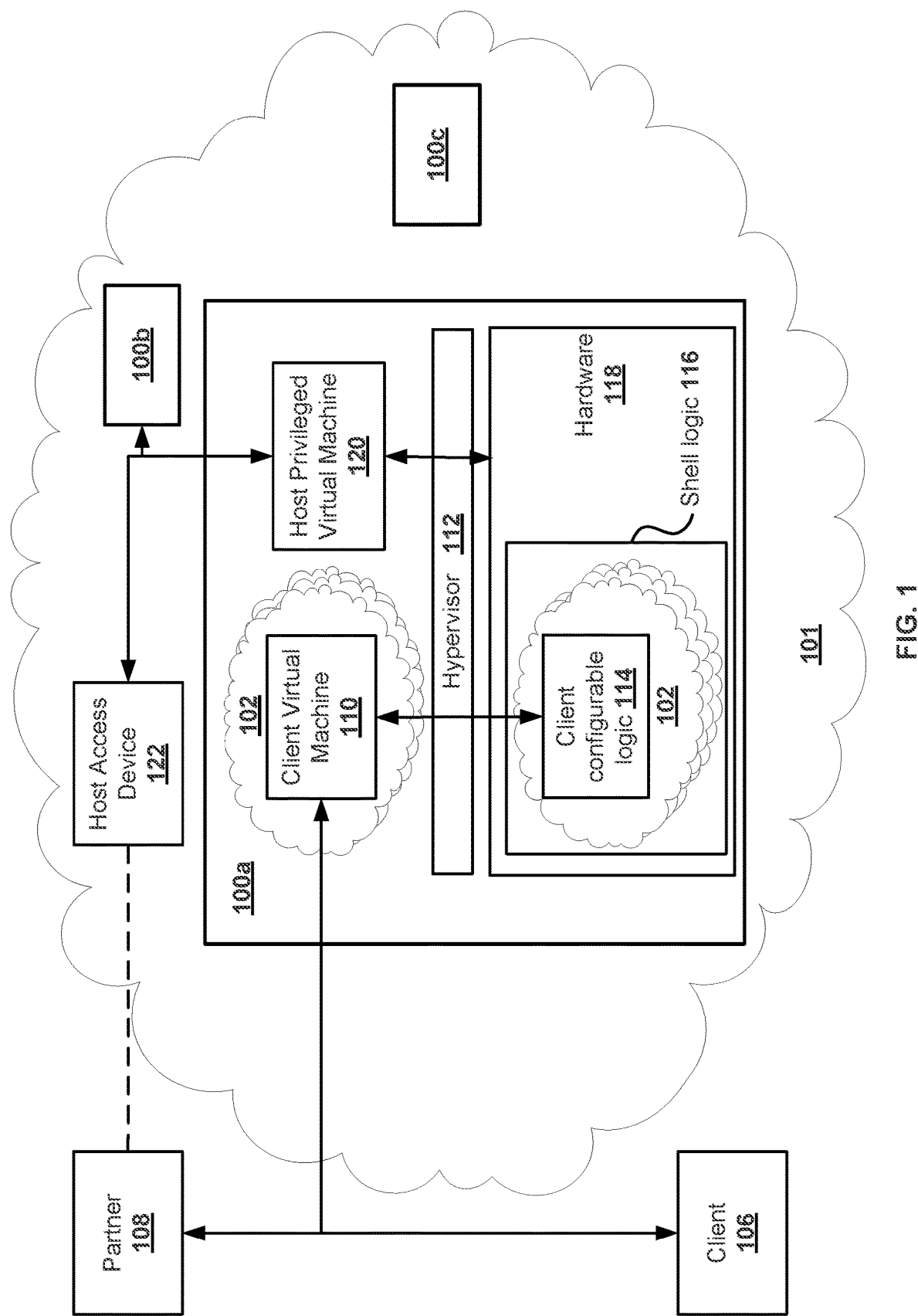
FIG. 1 illustrates a cloud computing system and corresponding domains according to certain embodiments.

Cloud service providers can utilize virtualization techniques which can include physically or logically isolating host services to a host domain and client services to client domains. A domain refers to, for example, a group of logical computer devices and/or hardware computers and devices on a network that are administered as a unit with common rules and procedures. By isolating a client domain from a host domain, a client may be able to access certain functionality provided by a cloud service and may be restricted from accessing functionality of the host domain. For example, host domain functionality can include management of the cloud infrastructure which, if accessed by a client system, could jeopardize functionality of the cloud system. Furthermore, logical domain separation allows various platforms and services to be abstracted from the underlying hardware, providing flexibility within a cloud infrastructure to service a multitude of varied and differing client requirements and more efficiently assign the underlying hardware and other computer resources between client domains. A certain amount of overhead may be introduced to facilitate logical separation of different domains. This overhead may take the form of reduced performance of client services and/or client access to services. Certain clients may desire to have specialized computing resources (e.g., hardware computing resources) that may enable more efficient processing of certain client functions. Disclosed are techniques that can be used to enable use of specialized hardware computing resources within a cloud environment while still providing separation between a host domain and a client domain on which the specialized hardware computing resources may reside.

A solution for providing specialized hardware computing resources in a cloud environment is to provide a networked computing resource including a client configurable logic circuit. The client configurable logic circuit can be included within an add-in card to a networked computer device and may include configurable logic, such as a field-programmable gate array (FPGA). Configurable logic is hardware that can be programmed or configured to perform a logic function. Configurations of the configurable logic can be specified according to configuration data that is applied to or loaded by the configurable logic. For example, a user of the computing resources can provide a specification (such as source code written in a hardware description language) for configuring the configurable logic, the configurable logic can be configured according to the specification, and the configured logic can thereafter be used to perform a task for the user. However, allowing a client of a cloud service access to low-level hardware of a cloud computer device can potentially introduce security and privacy issues within the cloud infrastructure. As a specific example, a faulty or malicious design from one client could potentially cause a denial of service to other users if the configured logic causes one or more devices within the cloud infrastructure to malfunction (e.g., crash, hang, or reboot) or be denied infrastructure resources. As another specific example, a faulty or malicious design from one user could potentially corrupt or read data from another client if the configured logic is able to read and/or write memory of the other client's memory space.

As described herein, a cloud infrastructure can include a variety of computer resources, where one type of the computer resources can include a computer device comprising a client configurable logic circuit. The client configurable logic circuit can be programmed or configured by a client of the cloud infrastructure so that hardware (e.g., the configurable logic) of the computing resource is customized by the client. For example, the client can program the configurable logic so that it functions as a hardware accelerator that is tightly coupled to the computer device. As a specific example, the hardware accelerator can be accessible via a local interconnect, such as Peripheral Component Interconnect Express (PCI-Express or PCIe), of the computer device. The client can execute an application on the computer device and tasks of the application can be performed by the hardware accelerator using PCIe commands. By tightly coupling the hardware accelerator to the computer device, the latency between the accelerator and the computer device can be reduced which can potentially increase the processing speed of the application.

Management and organization of client configuration data within a cloud infrastructure system to implement client access to hardware components with the system can introduce a number of issues. For example, one hardware component (such as the aforementioned FPGA) may service several clients. Each client may configure the hardware component according to their specific set of client configuration data. The clients may not have insight into an exact hardware component used to implement their logic and/or the ancillary supporting components of a hosted or cloud computer infrastructure system (e.g., a make/model of FGPA and/or the cooling or power supply components coupled to the FGPA). Furthermore, the client may be unable to verify if certain configurations of hardware component(s) are supported within a cloud infrastructure. One configuration variable of a reconfigurable hardware component within a cloud infrastructure system used to implement client configuration data can be a clock speed that the reconfigurable hardware component is set to operate at.

Techniques disclosed herein can be used to associate and manage clock frequency data with each of corresponding sets/images of client configuration data. A specific client configuration data image can be linked to corresponding clock frequency data that can be used to setup a reconfigurable hardware component for implementing the client configuration data image. The clock frequency data can be used to setup the reconfigurable hardware component to operate at clock(s) that are verified to be stable and not impact operations of a cloud infrastructure system that the reconfigurable hardware component is included within. For example, the reconfigurable hardware component can be setup to operate at specific clock frequencies that may be known not to overly stress cloud computer infrastructure cooling and/or power delivery components. In certain embodiments, the reconfigurable hardware component may be set to operate at certain clock(s) depending on a service level of a client. For example, clients may provide more compensation for access to higher service levels that may be associated with faster clock speeds. In still other embodiments, the clock data may be used to decouple a certain model/type of reconfigurable hardware component from the client configuration data supporting upgrades and/or interoperability of the client configuration data through the cloud infrastructure system.

FIG. 1 illustrates a simplified logical diagram of a host domain 101 of a cloud infrastructure system that may provide one or more cloud enabled services to a client 106 or a type of client referred to as a partner device 108. Host domain 101 can reside within a cloud infrastructure system. Computer devices 100a-100c and host access device 122 can each reside within the cloud infrastructure system. Computer devices 100a-100c and host access devices 122 can reside within host domain 101. Hypervisor 112, client virtual machine 110, host privileged virtual machine 120, and hardware 118 can reside within computer device 100a. Hypervisor 112 can provide separation between domains of the cloud infrastructure system by, for example, managing interactions between logical and/or physical devices across between domains. A hypervisor may be used to generate and/or manage logical components that can be implemented using hardware components of a cloud infrastructure system.

Partner device 108 may be a client of host domain 101 that is privileged to utilize cloud resources to provide a service. For example, partner device 108 can be used to request, via host access device 122, one or more resources of the cloud infrastructure system to enable a service. Client 106 may be a user of a service of partner device 108. Thus, partner device 108 may have more privileged access to cloud infrastructure system than client 106. The service can be enabled through use of one or more hardware components 118 of computer device 100a within host domain 101. The one or more hardware devices 118 can be logically abstracted, via hypervisor 112, into a client virtual machine 110 that client 106 or partner device 108 is privileged to access. Hypervisor 112 can manage client virtual machine 110 and other virtual machines that may operate within host domain 101 (such as host privileged virtual machine 120). Host privileged virtual machine 120 is a privileged type of virtual machine that may have direct access to hardware 118, drivers, or an operating system of computer device 100a. Hardware 118 can include processors, memory, fixed function hardware, peripherals, and/or client configurable logic 114. The operating system may manage/schedule interactions between logical virtual machines and physical components within host domain 101. Client virtual machine 110 can be one of several virtual machines operating within computer device 100a and can be logically separated from hardware devices of host domain 101 that services client virtual machine 110. In certain embodiments, a computer device, such as computer device 100b may be a purely hardware device that is included within a client domain (such as client domain 102). A client, via client device 106, may access computer device 100b via a corresponding client domain. Thus, hardware device(s) may be configured for access by a client of a service provider/cloud infrastructure without use of logical/virtualization techniques by isolating access to the hardware device(s) to the client (while included within the client domain). An access control entity can limit access between components within a service-provider infrastructure (such as a cloud infrastructure network) in a spatial and/or time partitioned manner to enable each of client or users of the service provider network access to components within their respective domain while limiting access by other users. However, access may still be allowed for a device or user having a higher privilege level (e.g., a device or user within host domain 101). A hypervisor is an example of an access control entity that can manage access between logical and/or physical devices between domains.

The logical separation of client virtual machine 110 can be accomplished by logically isolating client virtual machine 110 into a client domain 102. Client domain 102 can be separated from a host domain 101 of a cloud infrastructure system. Hypervisor 112 may reside on the host domain 101 but have access to client domain 102 whereas virtual or physical devices of client domain 102 may be prevented from accessing virtual or physical devices of host domain 101 (or other client domains). Techniques disclosed herein can be used to create and manage client configurable logic 114 within the cloud infrastructure system. Client configurable logic 114 can include configurable hardware logic that can be used by partner device 108, for example, to implement and have access to a hardware device within the cloud infrastructure system.

Client configurable logic 114 can be configured to act as a hardware accelerator, for example. The hardware accelerator can be created using programmable logic device(s) such that multiple clients may be able to configure differing accelerators using a same underlying hardware device. As disclosed herein, client configurable logic 114 may reside within client domain 102. However, access between client virtual machine 110 and client configurable logic 114 may pass through a host domain 101 of a cloud infrastructure system so that the cloud infrastructure system can manage and monitor access to the underlying hardware components implementing client configurable logic 114.

Figure 2:
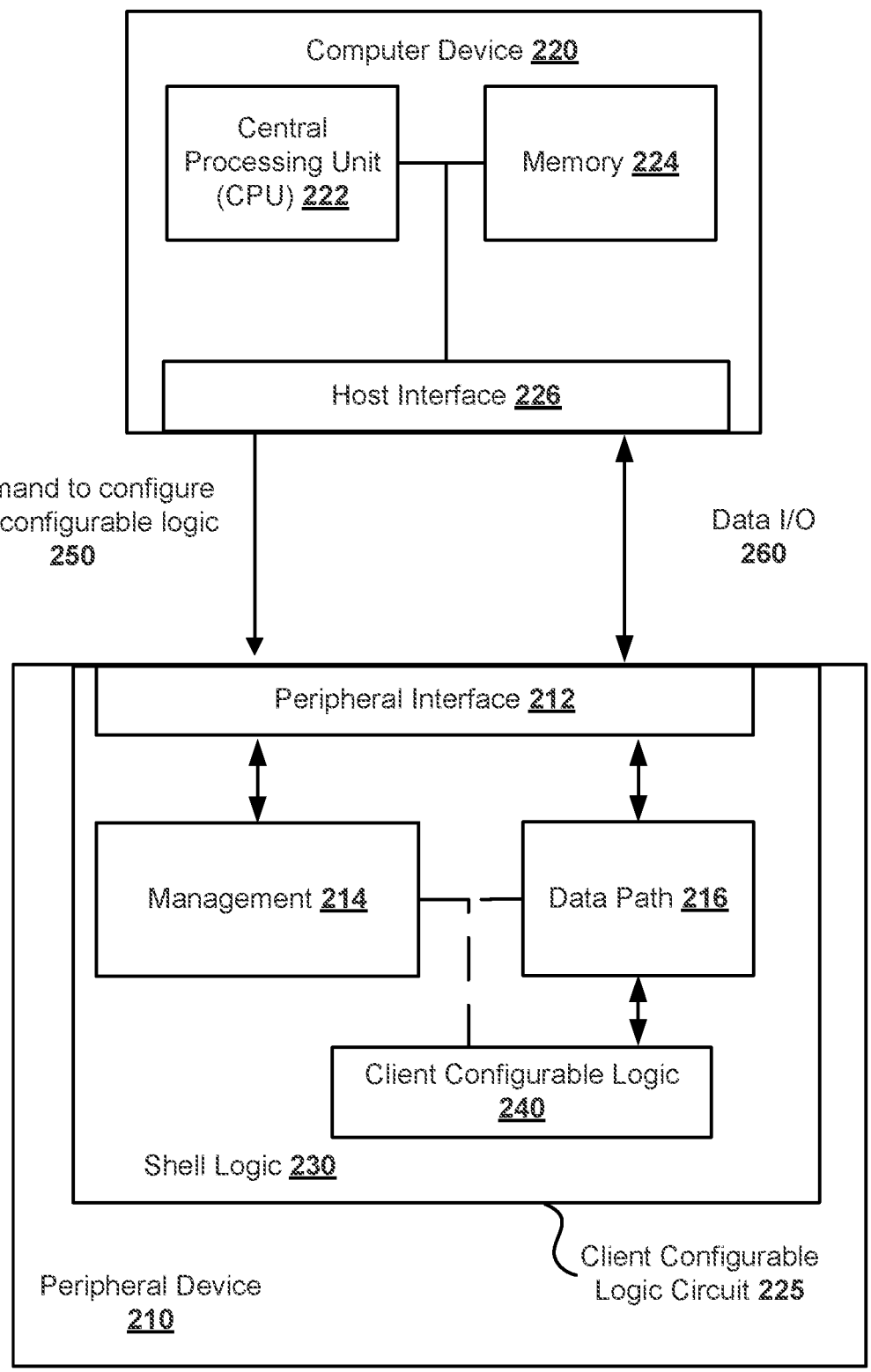
FIG. 2 illustrates a system diagram showing an example of a system including a client configurable logic circuit.

FIG. 2 is a system diagram showing an example of a computing system 200 including a peripheral device 210 and a computer device 220. System 200 can be used to implement client virtual machine 110 and/or client configurable logic 114 of FIG. 1. For example, client configurable logic 240 (also called "client logic") can be similar to client configurable logic 114 and client virtual machine 110 can be implemented within computer device 220. Computer device 220 can include a central processing unit (CPU) 222, memory 224, and a host interface 226. The CPU 222 can be used to execute instructions stored in the memory 224. For example, the memory 224 can be loaded with all or a portion of the cloud service and the CPU 222 can execute the instructions of the cloud service. The cloud service can communicate with a hardware accelerator of the peripheral device 210 by issuing commands using the host interface 226.

A command can be a read request, a write request, a read response, a message, an interrupt, or other various data transmittals. The command can occur on a bus shared by multiple components. Specifically, values of signal lines of the bus can be modulated to transfer data on the bus using a communications protocol of the bus. The command can occur over one or more phases, such as an address phase and one or more data phases. Additionally or alternatively, the command can occur using one or more serial lines of a point-to-point interconnect that connects two components. Specifically, the command can be sent in a packet that is transmitted over the point-to-point interconnect.

The host interface 226 can include a bridge for communicating between the CPU 222 using a local or front-side interconnect and components using a peripheral or expansion interconnect. Specifically, the host interface 226 can be connected to a physical interconnect that is used to connect the computer device 220 to the peripheral device 210 and/or to other components. For example, the physical interconnect can be an expansion bus for connecting multiple components together using a shared parallel bus or serial point-to-point links. As a specific example, the physical interconnect can be PCI express, PCI, or another physical interconnect that tightly couples the computer device 220 to the peripheral device 210. Thus, the computer device 220 and the peripheral device 210 can communicate using PCI bus commands or PCIe packets, for example.

The peripheral device 210 can include a client configurable logic circuit 225 including shell logic 230 and client configurable logic 240. The shell logic 230 can include a peripheral interface 212, a management module 214, and data path module 216. The client configurable logic 240 can include hardware that is configurable to implement a hardware accelerator, for example. In other words, the client configurable logic 240 can include logic that is programmable to perform a given function. For example, the client configurable logic 240 can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and/or programmable input/output pins.

The shell logic 230 can be used to encapsulate the client configurable logic 240. For example, the client configurable logic 240 can interface with various components of the shell logic 230 using predefined interfaces so that the client configurable logic 240 is restricted in access to components of peripheral device 210. The shell logic 230 can include logic that isolates different components of the peripheral device 210 from the client configurable logic 240. As one example, hard macros of the peripheral device 210 (such as a configuration access port or circuits for signaling on the physical interconnect) can be masked off so that the client configurable logic 240 cannot directly access the hard macros.

The shell logic 230 can include the peripheral interface 212 for communicating with the computer device 220. Specifically, the peripheral interface 212 can be used to enable communicate with the computer device 220 using a communication protocol and a physical interconnect. As one example, the computer device 220 can communicate with the peripheral device 210 using a command including an address associated with the peripheral device 210. Similarly, the peripheral device 210 can communicate with the computer device 220 using a command including an address associated with the computer device 220. The addresses associated with the various devices connected to host interface 226 can be predefined by a system architect and programmed into the devices. Additionally or alternatively, the communication protocol can include an enumeration sequence where the devices connected to the host interface 226 are queried and where addresses are assigned to each of devices as part of the enumeration sequence. As one example, the host interface 226 can issue queries to each of the devices connected to the host interface 226. The peripheral interface 212 can respond to the queries by providing information about the peripheral device 210, such as how many functions are present on the peripheral device 210, and a size of an address range associated with each of the functions of the peripheral device 210. Based on this information, addresses of the computing system 200 can be allocated such that each function of each device connected to the physical interconnect is assigned a non-overlapping range of addresses. After enumeration, the peripheral interface 212 can route commands to functions of the peripheral device 210 based on an address of the command.

The shell logic can include the management module 214 that can be used for managing and configuring the peripheral device 210. Commands and data can be sent from the computer device 220 to the management module 214 using commands that target the address range of the management module 214. For example, the computer device 220 can generate commands to transfer data (e.g., configuration data)

and/or write control registers of the peripheral device 210 that are mapped to one or more addresses within the address range of the management module 214. Writing the control registers can cause the peripheral device 210 to perform operations, such as configuring and managing the peripheral device 210. As a specific example, configuration data corresponding to configurable logic to be implemented in the client configurable logic 240 can be transmitted from the computer device 220 to the peripheral device 210 in one or more commands between host interface 227 and peripheral interface 212. A command 250 to configure the client configurable logic 240 with the configuration data can be transmitted from the computer device 220 to the peripheral device 210. Specifically, the command 250 can write a value to a control register mapped to the management module 214 address space that will begin configuring the client configurable logic 240. In one embodiment, the configuration data can be transferred from the computer device 220 to the peripheral device 210 before the configuration of the client configurable logic 240 begins. For example, the management module 214 can cause the configuration data to be stored in an on-chip or off-chip memory accessible by the peripheral device 210, and the configuration data can be read from the memory when the client configurable logic 240 is being configured. In another embodiment, the configuration data can be transferred from the computer device 220 to the peripheral device 210 after the configuration of the client configurable logic 240 begins. For example, a control register can be written to begin configuration of the client configurable logic 240 and the configuration data can be streamed into or loaded onto the client configurable logic 240 as commands including the configuration data are processed by the management module 214.

The shell logic 230 can include a data path module 216 that can be used to exchange information (e.g., data input/output 260) between the computer device 220 and the peripheral device 210. Specifically, commands and data can be sent from the computer device 220 to the data path module 216 using commands that target the address range of the data path module 216. Similarly, the peripheral device 210 can communicate with the computer device 220 using a command including an address associated with the computer device 220. The data path module 216 can act as a translation layer between the peripheral interface 212 and the client configurable logic 240. Specifically, the data path module 216 can include an interface for receiving information from the client configurable logic 240 and the data path module 216 can format the information for transmission from the peripheral interface 212. Formatting the information can include generating control information for one or more commands and partitioning data into blocks that are sized to meet protocol specifications. Thus, the data path module 216 can be interposed between the client configurable logic 240 and the physical interconnect. In this manner, the client configurable logic 240 can potentially be blocked from formatting commands and directly controlling the signals used to drive the physical interconnect so that the client configurable logic 240 cannot be used to inadvertently or maliciously violate protocols of the physical interconnect.

Figure 3:
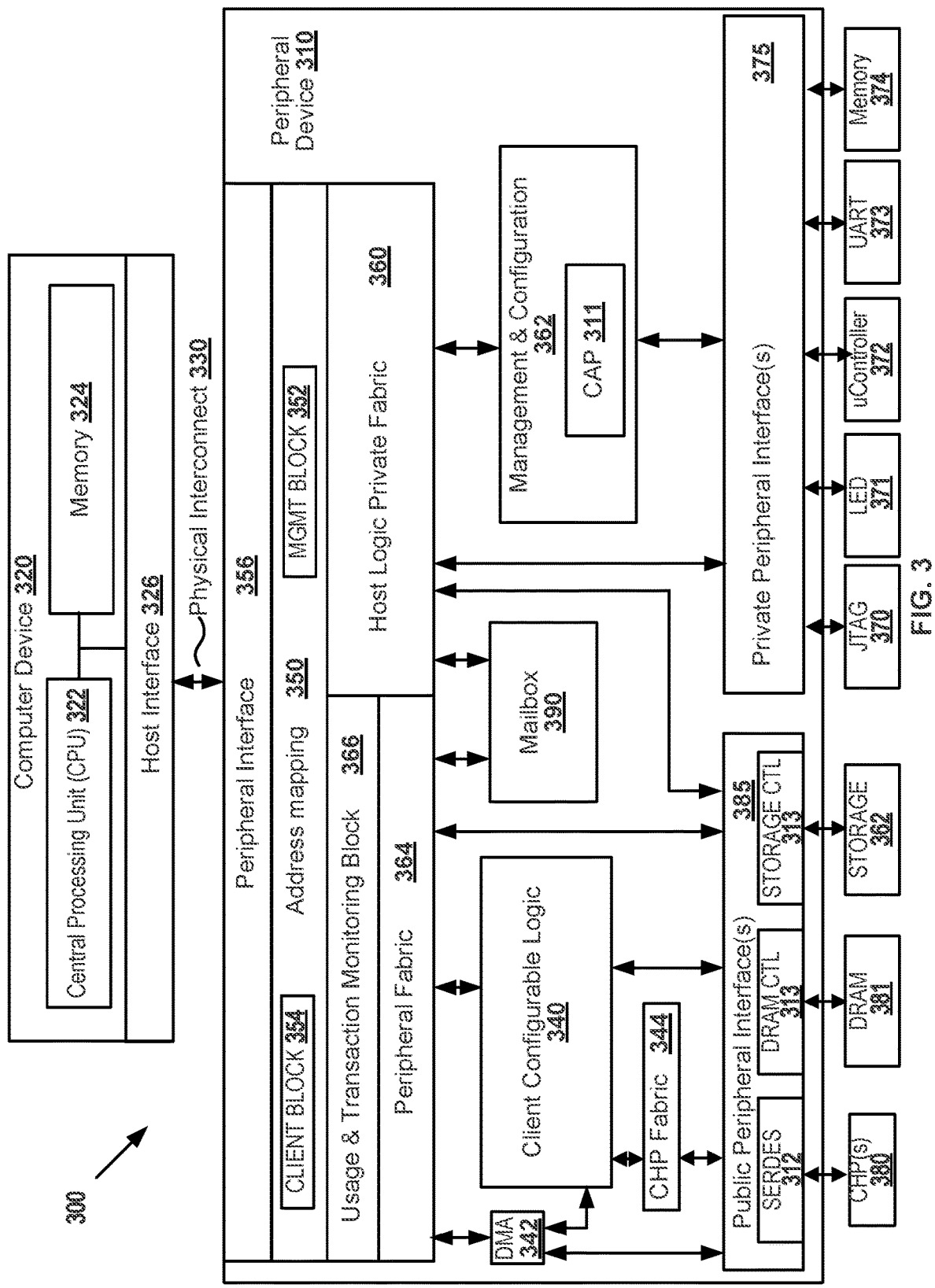
FIG. 3 illustrates a system diagram showing additional features of a system including a client configurable logic circuit.

FIG. 3 illustrates a system diagram showing an example of a system 300 including a peripheral device 310 and a computer device 320. Peripheral device 310 can be similar to peripheral device 210 and computer device 320 can be similar to computer device 220. The computer device 320 and the peripheral device 310 can be connected via a physical interconnect 330. For example, the physical interconnect 330 can be PCI express, PCI, or any other interconnect that couples the computer device 320 to the peripheral device 310. The computer device 320 can include a CPU 322, memory 324, and an host interface 326. For example, the host interface 326 can provide bridging capability so that the computer device 320 can access devices that are external to the computer device 320. For example, the host interface 326 can include root complex functionality as used in PCI express.

The peripheral device 310 can include a client configurable logic circuit and other hardware. The client configurable logic circuit can be configured or programmed to perform various functions of the peripheral device 310. The client configurable logic circuit can be configured multiple times with different configurations so that the client configurable logic circuit can perform different functions to service multiple clients. The functions of the peripheral device 310 can be categorized based upon the purpose or capabilities of each function, or based upon when the function is loaded into the peripheral device 310. For example, the peripheral device 310 can include static logic, reconfigurable logic, and hard macros. The functionality for the static logic, reconfigurable logic, and hard macros can be configured at different times. Thus, the functionality of the peripheral device 310 can be loaded incrementally.

A hard macro can perform a predefined function and can be available when the peripheral device 310 is powered on. For example, a hard macro can include hardwired circuits that perform a specific function. As specific examples, the hard macros can include a configuration access port (CAP) 311 for configuring the peripheral device 310, a serializer-deserializer transceiver (SERDES) 312 for communicating serial data, a memory or dynamic random access memory (DRAM) controller 313 for signaling and controlling off-chip memory (such as a double data rate (DDR) DRAM 381), and a storage controller 314 for signaling and controlling a storage device 382.

Client configurable logic and shell logic may reside on a same programmable logic device. The static logic can be loaded at boot time into the shell logic. Configuration data specifying the functionality of the static logic can be loaded from an on-chip or off-chip flash memory device during a boot-up sequence. The boot-up sequence can include detecting a power event (such as by detecting that a supply voltage has transitioned from below a threshold value to above the threshold value) and deasserting a reset signal in response to the power event. An initialization sequence can be triggered in response to the power event or the reset being deasserted. The initialization sequence can include reading configuration data stored on the flash device and loading the configuration data onto the peripheral device 310 using the configuration access port 311 so that at least a portion of the shell logic is programmed with the functionality of the static logic. After the static logic is loaded, the peripheral device 310 can transition from a loading state to an operational state that includes the functionality of the static logic.

The client configuration data can be used to configure programmable logic hardware within the client configurable logic while the peripheral device 310 is operational (e.g., after the static logic has been loaded). The client configuration data corresponding to the client configurable logic can be stored in an on-chip or off-chip memory and/or the configuration data can be received or streamed from an interface (e.g., the peripheral interface 356) of the peripheral device 310. The client configurable logic circuit can include several non-overlapping client configurable logic regions, which can each interface with static logic of shell logic. For example, the regions can be arranged in an array or other regular or semi-regular structure. For example, the array structure may include holes or blockages where hard macros are placed within the array structure. The different regions can communicate with each other, the static logic, and the hard macros by using signal lines that can be specified as static logic of shell logic. The different regions can be configured at different points in time so that a first region can be configured at a first point in time and a second region can be configured at a second point in time.

Commands from the computer device 320 bound for the peripheral device 310 can be identified using an address within the command. Specifically, if the address of the command falls within the range of addresses assigned to the peripheral device 310, the command is destined for the peripheral device 310. The command can be sent over the physical interconnect 330 and received at the peripheral interface 356. The peripheral interface 356 can be an endpoint of the physical interconnect 330. It should be understood that the physical interconnect 330 can include additional devices (e.g., switches and bridges) arranged in a fabric for connecting devices or components to the computer device 320.

The address mapping module 350 can analyze the address of the command and determine where to route the command within the peripheral device 310 based on the address. For example, the management block 352 can be assigned a first range of addresses and different functions of the management plane can be accessed by using different addresses within that range. Commands with addresses falling within the range assigned to the management block 352 can be routed through the host logic private fabric 360 to the different blocks within the host domain. For example, commands can be addressed to a management and configuration block 362. Similarly, the client block 354 can be assigned a second range of addresses and different functions can be accessed by using different addresses within that range.

The management and configuration block 362 can include functions related to managing and configuring the peripheral device 310. For example, the management and configuration block 362 can provide access to the configuration access port 311 so that the reconfigurable logic blocks can be configured. For example, the computer device 320 can send a command to the management and configuration block 362 to initiate loading of the client configuration data into the client configurable logic 340. Client configuration data corresponding to a respective configuration of the client configurable logic 340 can be sent from the computer device 320 to the management block 352. The management block 352 can route the client configuration data through the host logic private fabric 360 to the configuration access port 311 so that the client configuration data can be loaded.

As another example, the management and configuration block 362 can store data about the peripheral device 310. For example, versions of the different client configuration data images, update histories, and other information can be stored in memory of the management and configuration block 362. The computer device 320 can read the memory to retrieve some or all of the data. Specifically, the computer device 320 can send a read request targeting the memory of the management and configuration block 362 and the management and configuration block 362 can generate read response data to return to the computer device 320.

In certain embodiments, management and configuration block 362 can configure a logic device implementing client configurable logic 340. For example, configuration registers of a programmable logic device can be populated by management and configuration block 362 to, for example, set configurations of input/output pins, set clock values that at least a portion of the device operates according to, set a clock divider value, set operating voltage(s), set permissions between portions of the logic device, etc. In certain embodiments, components external to the logic device may be configured, for example an externally provided clock to the logic device. Depending on a particular configuration of the logic device (e.g., per client configuration), management and configuration block 362 can configure the logic device accordingly. For example, a first client configuration may require the client configurable logic 340 to operate at a first frequency and a second client configuration may require the client configurable logic 340 to operate at a second frequency. It may be desirable to prevent a client from being able to access certain aspects regarding a configuration of a logic device implementing client configurable logic. For example, misconfiguration of the logic device may damage the device or may have adverse effects on shell logic or other clients' configurations of client configurable logic 340 (that might be concurrently operating, for example).

The management block 352 can also be used to access private peripherals of the peripheral device 310. Private peripherals can include a JTAG (e.g., IEEE 1149.1) controller 370, light emitting displays (LEDs) 371, a microcontroller 372, a universal asynchronous receiver/transmitter (UART) 373, a memory 374 (e.g., a serial peripheral interface (SPI) flash memory), and other components that may be accessible via a host domain. The management block 352 can access the private peripherals by routing commands through the shell logic private fabric 360 and the private peripheral interface(s) 375. The private peripheral interface(s) 375 can directly communicate with the private peripherals.

Public peripherals are configurable and may reside on a client domain and may be accessible by a client configurable logic circuit or may reside on a host domain. For example, the public peripherals can be accessed by addressing commands within the address range assigned to the management block 352. The public peripherals can be accessed by addressing commands within the address range assigned to the client block 354. Examples of the public peripherals are other configurable hardware platform(s) (CHP(s)) 380, DRAM 381 (e.g., DDR DRAM), storage devices 382 (e.g., hard disk drives and solid-state drives), and other various components that can be used to generate, store, or process information. The public peripherals can be accessed via the public peripheral interfaces 385. Thus, the public peripheral interfaces 385 can be an intermediary layer transposed between the public peripherals and the other functions of the peripheral device 310. Specifically, the public peripheral interfaces 385 can format communications to the public peripherals into a native protocol of the public peripherals.

Mailboxes 390 can be used to pass messages and other information between the client domain and the host domain. For example, the mailboxes 390 can include buffers, control registers (such as semaphores), and status registers. By using the mailboxes 390 as an intermediary between the client and host domains, isolation between the client domain and the host domain can be maintained while still providing functionality to pass messages between the two.

The client block 354 can be used to access components residing on the client domain, such as the client configurable logic 340. For example, a command directed to the client configurable logic 340 can cause data to be loaded, processed, and/or returned to the computer device 320. Specifically, the client domain component can be accessed using commands having an address within the range assigned to the client block 354. For example, a command can be sent from the computer device 320 to the client configurable logic 340 via the client block 354. Specifically, commands addressed to the client block 354 can be routed through the peripheral fabric 364 to the client configurable logic 340. Responses from the client configurable logic 340 can be routed through the peripheral fabric 364 to the client block 354, and then back to the computer device 320. Additionally, the data and commands generated by the client configurable logic 340 can be monitored using a usage and command monitoring block 366. The monitoring block 366 can potentially identify commands or data that violate predefined rules and can generate an alert to be sent. Additionally or alternatively, the monitoring block 366 can terminate any commands generated by the client configurable logic 340 that violate any criteria of the monitoring block 366. Additionally, the monitoring block 366 can analyze information moving to or from the client configurable logic 340 so that statistics about the information can be collected and accessed.

Data can also be transferred between the computer device 320 and the configurable logic by programming a direct memory access (DMA) engine 342. The DMA engine 342 can include control and status registers for programming or specifying DMA transfers from a source location to a destination location. As one example, the DMA engine 342 can be programmed to pull information stored within the memory 324 of computer device 320 into the client configurable logic 340 or into the public peripherals of the peripheral device 310. As another example, the DMA engine 342 can be programmed to push data that has been generated by the client configurable logic 340 to the memory 324 of the computer device 320. The data generated by the client configurable logic 340 can be streamed from the client configurable logic 340 or can be written to the public peripherals, such as the memory 381 or storage 382.

The client configurable logic 340 can communicate with other configurable hardware platforms 380. For example, the other configurable hardware platforms 380 can be connected by one or more serial lines that are in communication with the SERDES 312. The client configurable logic 340 can generate commands to the different configurable hardware platforms 380, and the commands can be routed through the CHP fabric 344 to the corresponding serial lines (via the SERDES 312) of the configurable hardware platforms 380. Similarly, the client configurable logic 340 can receive information from other configurable hardware platforms 380 using the reverse path.

Figure 4:
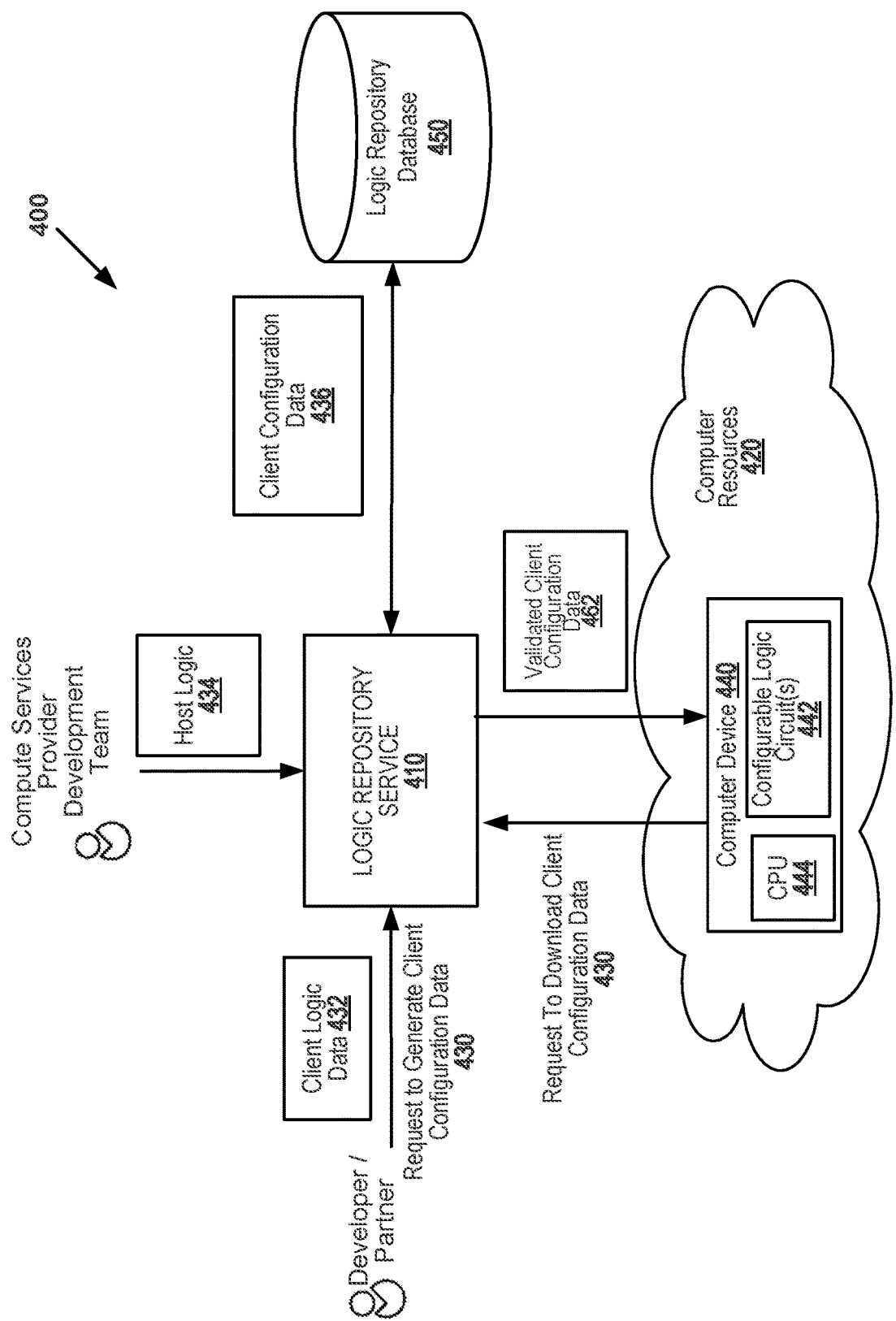
FIG. 4 illustrates a system diagram showing an example of a system including a logic repository service for supplying configuration data to a client configurable logic circuit.

FIG. 4 illustrates a system diagram showing an example of a system 400 including a logic repository service 410 for managing configuration data that can be used to configure configurable resources within a fleet of compute resources 420. System 400 can be utilized within the cloud infrastructure of FIG. 1. A cloud service provider can maintain the fleet of computer resources 420 for users of the services to deploy when a computing task is to be performed. The computer resources 420 can include computer devices 440 having client configurable logic circuit(s) 442 that can be programmed to include client specific hardware accelerator(s). The cloud service provider can manage the computer resources 420 using techniques disclosed herein to manage the configuration and operation of the client configurable logic circuit(s) 442. As one example, a host privileged machine (e.g., Host Privileged Machine 120) can execute a logic repository service 410 for accessing client logic data 432 (e.g., a specific client logic image/design) specified by a user, generating client configuration data 436 for configuring the client configurable logic circuit based on the logic design of the user, and downloading the validated configuration data 462 in response to a request 460 to configure an instance of the client configurable logic circuit. The download request 460 can be from the user that developed the configurable logic (e.g., a partner) or from a user that has acquired a license to use the configurable logic (e.g., a client). The client configuration data 436 can be created by the host privileged machine, a user, or a third-party separate from the user or the host privileged machine. For example, a marketplace of accelerator intellectual property (IP) can be provided to the users of the cloud infrastructure, and the users can potentially increase the speed of their applications by selecting an accelerator from the marketplace.

The logic repository service 410 can be a network-accessible service, such as a web service. Web services are commonly used in cloud computing. A web service is provided at a network address over the web or the cloud. Users can initiate web service requests to computer devices of a cloud infrastructure and the computer devices can process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web-most commonly by means of an HTTP-based web server. Thus, in certain implementations, an API can be defined as a set of Hypertext Transfer Protocol (HTTP) request interfaces, along with a definition of the structure of the messages used to invoke the API and the response messages, which can be in an Extensible Markup Language (XML) or JavaScript Object Notation (JSON) format. The API can specify a set of functions or routines that perform an action, which includes accomplishing a specific task or allowing interaction with a computer device. When a web service receives the API request from a client device, the web service can generate a response to the request and send the response to the endpoint identified in the request. Additionally or alternatively, the web service can perform actions in response to the API request without generating a response to the endpoint identified in the request.

The logic repository service 410 can receive an API request 430 to generate client configuration data for a client configurable logic circuit, such as the client configurable logic circuit(s) 442 of the computer device 440. For example, the API request 430 can be originated by a developer or partner user of the compute services provider. The request 430 can include fields for specifying data and/or data about the logic design, the configurable hardware platform, user information, access privileges, production status, and various additional fields for describing information about the inputs, outputs, and users of the logic repository service 410. As specific examples, the request can include a description of the design, a production status (such as trial or production), an encrypted status of the input or output of the service, a reference to a location for storing an input file (such as the hardware design source code), a type of the input file, an instance type of the configurable hardware, and a reference to a location for storing an output file or report. In particular, the request can include a reference to a hardware design specifying client logic data 432 for implementation on the configurable hardware platform. Specifically, a specification of the client logic data 432 and/or of the host logic 434 can be a collection of files, such as source code written in a hardware description language (HDL), a netlist generated by a logic synthesis tool, and/or placed and routed logic gates generated by a place and route tool.

The compute resources 420 can include many different types of hardware and software categorized by instance type. In particular, an instance type specifies at least a portion of the hardware and software of a resource. For example, hardware resources can include servers with central processing units (CPUs) of varying performance levels (e.g., different clock speeds, architectures, cache sizes, and so forth), servers with and without co-processors (such as graphics processing units (GPUs) and configurable logic), servers with varying capacity and performance of memory and/or local storage, and servers with different networking performance levels. Example resources can include different operating systems, application programs, and drivers. One example instance type can comprise the computer device 440 including a central processing unit (CPU) 444 in communication with the client configurable logic circuit(s) 442. The client configurable logic circuit(s) 442 can include programmable logic such as an FPGA, a programmable logic array (PLA), a programmable array logic (PAL), a generic array logic (GAL), or a complex programmable logic device (CPLD), for example. As specific examples, an "F1.small" instance type can include a first type of computer device with one capacity unit of FPGA resources, an "F1.medium" instance type can include the first type of computer device with two capacity units of FPGA resources, an "F1.large" instance type can include the first type of computer device with eight capacity units of FPGA resources, and an "F2.large" instance type can include a second type of computer device with eight capacity units of FPGA resources.

The logic repository service 410 can generate client configuration data 436 in response to receiving the API request 430. The generated client configuration data 436 can be based on the client logic data 432 and the host logic 434. Specifically, the generated client configuration data 436 can include information that can be used to program or configure the client configurable logic circuit(s) 442 so that it performs the functions specified by the client logic data 432 and the host logic 434. As one example, the cloud service provider can generate the host logic 434 including logic for interfacing between the CPU 444 and the client configurable logic circuit(s) 442. Specifically, the host logic 434 can include logic for masking or shielding the client logic data 432 from communicating directly with the CPU 444 so that all CPU-configurable logic commands pass through the host logic 434. In this manner, the host logic 434 can potentially reduce security and availability risks that could be introduced by the client logic data 432.

Generating the client configuration data 436 can include performing checks and/or tests on the client logic data 432, integrating the client logic data 432 into a host logic 434 wrapper, synthesizing the client logic data 432, and/or placing and routing the client logic data 432. Checking the client logic data 432 can include verifying the client logic data 432 complies with one or more criteria of the compute services provider. For example, the client logic data 432 can be analyzed to determine whether interface signals and/or logic functions are present for interfacing to the host logic 434. In particular, the analysis can include analyzing source code and/or running the client logic data 432 against a suite of verification tests. The verification tests can be used to confirm that the configurable logic is compatible with the shell logic. As another example, the client logic data 432 can be analyzed to determine whether the client logic data 432 fits within a designated region of the specified instance type. As another example, the client logic data 432 can be analyzed to determine whether the client logic data 432 includes any prohibited logic functions, such as ring oscillators or other potentially harmful circuits. As another example, the client logic data 432 can be analyzed to determine whether the client logic data 432 has any naming conflicts with the host logic 434 or any extraneous outputs that do not interface with the host logic 434. As another example, the client logic data 432 can be analyzed to determine whether the client logic data 432 attempts to interface to restricted inputs, outputs, or hard macros of the client configurable logic circuit(s) 442. If the client logic data 432 passes the checks of the logic repository service 410, then the client configuration data 436 can be generated. If any of the checks or tests fail, the generation of the client configuration data 436 can be aborted.

Generating the client configuration data 436 can include compiling and/or translating source code of the client logic data 432 and the host logic 434 into data that can be used to program or configure the client configurable logic circuit(s) 442. For example, the logic repository service 410 can integrate the client logic data 432 into a host logic 434 wrapper. Specifically, the client logic data 432 can be instantiated in a system design that includes the client logic data 432 and the host logic 434. The integrated system design can be synthesized, using a logic synthesis program, to create a netlist for the system design. The netlist can be placed and routed, using a place and route program, for the instance type specified for the system design. The placed and routed design can be converted to client configuration data 436 which can be used to program the client configurable logic circuit(s) 442. For example, the client configuration data 436 can be directly output from the place and route program.

As one example, the generated client configuration data 436 can include a complete or partial bitstream for configuring all or a portion of the configurable logic of an FPGA. An FPGA can include configurable logic and non-configurable logic. The configurable logic can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and programmable input/output pins. The bitstream can be loaded into on-chip memories of the configurable logic using configuration logic (e.g., a configuration access port). The values loaded within the on-chip memories can be used to control the configurable logic so that the configurable logic performs the logic functions that are specified by the bitstream. Additionally, the configurable logic can be divided into different regions which can be configured independently of one another. As one example, a full bitstream can be used to configure the configurable logic across all of the regions and a partial bitstream can be used to configure only a portion of the configurable logic regions. The non-configurable logic can include hard macros that perform a specific function within the FPGA, such as input/output blocks (e.g., serializer and deserializer (SERDES) blocks and gigabit transceivers), analog-to-digital converters, memory control blocks, test access ports, and configuration logic for loading the configuration data onto the configurable logic.

The logic repository service 410 can store the generated client configuration data 436 in a logic repository database

450. The logic repository database 450 can be stored on removable or non-removable media, including magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the logic repository service 410. Additionally, the logic repository service 410 can be used to store input files (such as the specifications for the client logic data 432 and the host logic 434) and data about the logic designs and/or the users of the logic repository service 410. The generated client configuration data 436 can be indexed by one or more properties such as a user identifier, an instance type or types, a marketplace identifier, a machine image identifier, and a configurable hardware identifier, for example.

The logic repository service 410 can receive an API request 460 to download configuration data. For example, the request 460 can be generated when a user of the compute resources 420 launches or deploys a new instance (e.g., an F1 instance) within the compute resources 420. As another example, the request 460 can be generated in response to a request from an application executing on an operating instance. The request 460 can include a reference to the source and/or destination instance, a reference to the configuration data to download (e.g., an instance type, a marketplace identifier, a machine image identifier, or a configurable hardware identifier), a user identifier, an authorization token, and/or other information for identifying the configuration data to download and/or authorizing access to the configuration data. If the user requesting the configuration data is authorized to access the configuration data, the configuration data can be retrieved from the logic repository database 450, and validated configuration data 462 (e.g. a full or partial bitstream) can be downloaded to the requesting instance (e.g., computer device 440). The validated configuration data 462 can be used to configure the configurable logic of the destination instance.

The logic repository service 410 can verify that the validated configuration data 462 can be downloaded to the requesting instance. Validation can occur at multiple different points by the logic repository service 410. For example, validation can include verifying that the client logic data 432 is compatible with the host logic 434. In particular, a regression suite of tests can be executed on a simulator to verify that the host logic 434 performs as expected after the client logic data 432 is added to the design. Additionally or alternatively, it can be verified that the client logic data 432 is specified to reside only in reconfigurable regions that are separate from reconfigurable regions of the host logic 434. As another example, validation can include verifying that the validated configuration data 462 is compatible with the instance type to download to. As another example, validation can include verifying that the requestor is authorized to access the validated configuration data 462. If any of the validation checks fail, the logic repository service 410 can deny the request to download the validated configuration data 462. Thus, the logic repository service 410 can potentially safeguard the security and the availability of the computer resources 420 while enabling a user to customize hardware of the computer resources 420.

Figure 5:
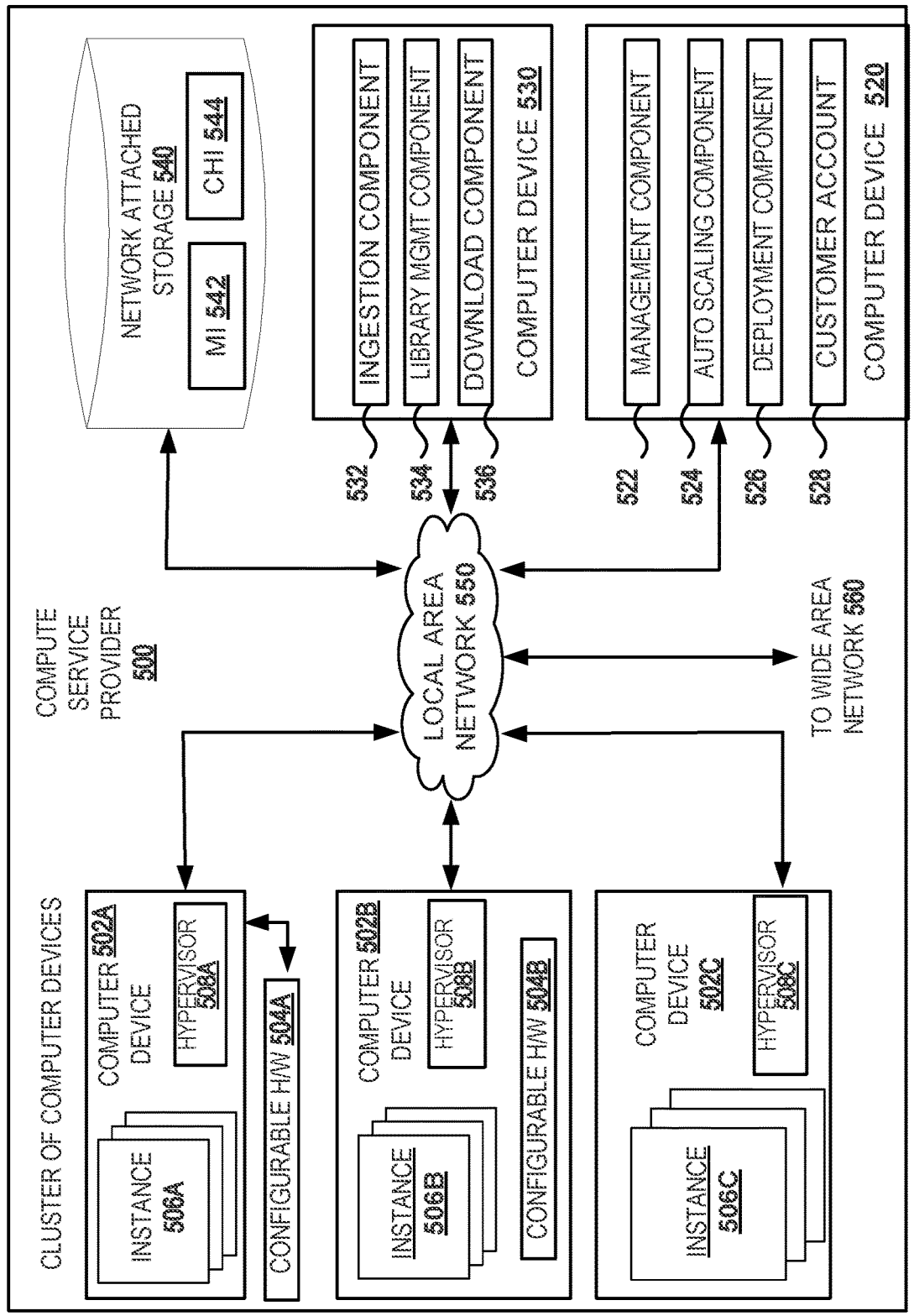
FIG. 5 illustrates an example system diagram showing a plurality of virtual machine instances running in a multi-tenant environment including computer devices having a client configurable logic circuit.

FIG. 5 illustrates a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of clients operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of computer devices 502A-502C. While only three computer devices are shown, any number can be used, and large centers can include thousands of computer devices. The computer devices 502A-502C can provide computing resources for executing instances 506A-506C. In one embodiment, the instances 506A-506C are virtual machines. As known in the art, a virtual machine can include logical resources that are emulated using physical components of machine(s) (e.g. computers). In the example of a virtual machine, each of the computer devices 502A-502C can be configured to execute a hypervisor 508 or another type of program configured to enable the execution of multiple instances 506 on a single computer device. Additionally, each of the instances 506 can be configured to execute one or more applications. The applications can include user or non-privileged programs, kernel or privileged programs, and/or drivers. In another embodiment (not shown), the instances can include an operating system and application programs controlled by a single client. Thus, the computer service provider 500 can partition the resources of a given computer device among multiple clients (such as by providing a different virtual machine to each client) and/or provide the full resources of a computer device to a single client. Each of instances 506 can reside within a respective client domain for the respective client (along with client configurable logic hardware).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The computer devices 502A-502C can include a heterogeneous collection of different hardware resources or instance types. Some of the hardware instance types can include configurable hardware that is at least partially configurable by a user of the compute service provider 500. One example of an instance type can include the computer device 502A which is in communication with client configurable logic hardware 504A. Specifically, the computer device 502A and the client configurable logic hardware 504A can communicate over a local interconnect such as PCIe. Another example of an instance type can include the computer device 502B and client configurable logic hardware 504B. For example, the client configurable logic hardware 504B can be integrated within a multi-chip module or on the same die as a CPU of the computer device 502B. Yet another example of an instance type can include the computer device 502C without any client configurable logic hardware. Thus, hardware instance types with and without configurable logic can be present within the resources of the compute service provider 500.

One or more computer devices 520 can be reserved for executing software components for managing the operation of the computer devices 502 and the software instances 506. For example, the computer device 520 can execute a management component 522. A client can access the management component 522 to configure various aspects of the operation of the software instances 506 purchased by the client. For example, the client can purchase, rent or lease instances and make changes to the configuration of the software instances. The configuration information for each of the software instances can be stored as a machine image (MI) 542 on the network-attached storage 540. As a specific example, the MI 542 can describe the information used to launch a VM instance. The MI can include a template for a root volume of the instance (e.g., an OS and applications), launch permissions for controlling which client accounts can use the MI, and a block device mapping which specifies volumes to attach to the instance when the instance is launched. The MI can also include a reference to a configurable hardware image (CHI) 542 which is to be loaded on configurable hardware 504 when the instance is launched. The CHI includes configuration data for programming or configuring at least a portion of the configurable hardware 504. As another specific example, the MI 542 can describe the information used to launch an instance of an operating system directly on one of the computer devices 520.

The client can also specify settings regarding how the purchased instances are to be scaled in response to demand. The management component can further include a policy document to implement client policies. An auto scaling component 524 can scale the instances 506 based upon rules defined by the client. In one embodiment, the auto scaling component 524 allows a client to specify scale-up rules for use in determining when new instances should be instantiated and scale-down rules for use in determining when existing instances should be terminated. The auto scaling component 524 can consist of a number of subcomponents executing on different computer devices 502A-502C or other computer devices. The auto scaling component 524 can monitor available computing resources over an internal management network and modify resources available based on need.

A deployment component 526 can be used to assist clients in the deployment of new instances 506 of computing resources. The deployment component can have access to account information associated with the instances, such as who is the owner of the account, credit card information, country of the owner, etc. The deployment component 526 can receive a configuration from a client that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 526 can utilize the client-provided configuration and cache logic to configure, prime, and launch new instances 506. For example, the deployment component 526 can be invoked when a client launches an instance from a control console, another instance, or a marketplace page. The control console can be a web-based service that provides an interface to a client of the compute service provider 500 so that the client can manage his or her account and access services. As one example, the control console can enable a user to upload MIs and/or CHIs to a private catalog, and images corresponding to a particular MI or CHI can be selected by the user from the private catalog when an instance is to be deployed. The configuration, cache logic, and other information used for launching instances may be specified by a client using the management component 522 or by providing this information directly to the deployment component 526. The instance manager can be considered part of the deployment component.

Client account information 528 can include any desired information associated with a client of the multi-tenant environment. For example, the client account information can include a unique identifier for a client, a client address, billing information, licensing information, customization parameters for launching instances, scheduling information, auto-scaling parameters, previous IP addresses used to access the account, a listing of the MI's and CHI's accessible to the client, etc.

One or more computer devices 530 can be reserved for executing software components for managing the download of configuration data to configurable hardware 504 of the computer devices 502A-502C. For example, the computer device 530 can execute a logic repository service comprising an ingestion component 532, a library management component 534, and a download component 536. Computer device 530 can implement functions of logic repository service 410. The ingestion component 532 can receive shell logic and configurable logic designs or specifications and generate configuration data that can be used to configure the configurable hardware 504. The library management component 534 can be used to manage source code, user information, and configuration data associated with the logic repository service. For example, the library management component 534 can be used to store configuration data generated from a user's design in a location specified by the user on the network-attached storage 540. In particular, the configuration data can be stored within a configurable hardware image 542 on the network-attached storage 540. Additionally, the library management component 534 can manage the versioning and storage of input files (such as the specifications for the configurable logic and the shell logic) and data about the logic designs and/or the users of the logic repository service. The library management component 534 can index the generated configuration data by one or more properties such as a user identifier, an instance type, a marketplace identifier, a machine image identifier, and a configurable hardware identifier, for example. The download component 536 can be used to authenticate requests for configuration data and to transmit the configuration data to the requestor when the request is authenticated. For example, agents on the computer devices 502A-B can send requests to the download component 536 when the instances 506 are launched that use the configurable hardware 504. As another example, the agents on the computer devices 502A-B can send requests to the download component 536 when the instances 506 request that the configurable hardware 504 be partially reconfigured while the configurable hardware 504 is in operation.

The network-attached storage (NAS) 540 can be used to provide storage space and access to files stored on the NAS 540. For example, the NAS 540 can include one or more computer devices used for processing requests using a network file sharing protocol, such as Network File System (NFS). The NAS 540 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 550.

The network 550 can be utilized to interconnect the computer devices 502A-502C, the computer devices 520 and 530, and the storage 540. The network 550 can be a local area network (LAN) and can be connected to a Wide Area Network (WAN) 560 so that end users can access the compute service provider 500. It should be appreciated that the network topology illustrated in FIG. 5 has been simplified and that many more networks and networking devices can be utilized to interconnect the various computing systems disclosed herein.

Figure 6:
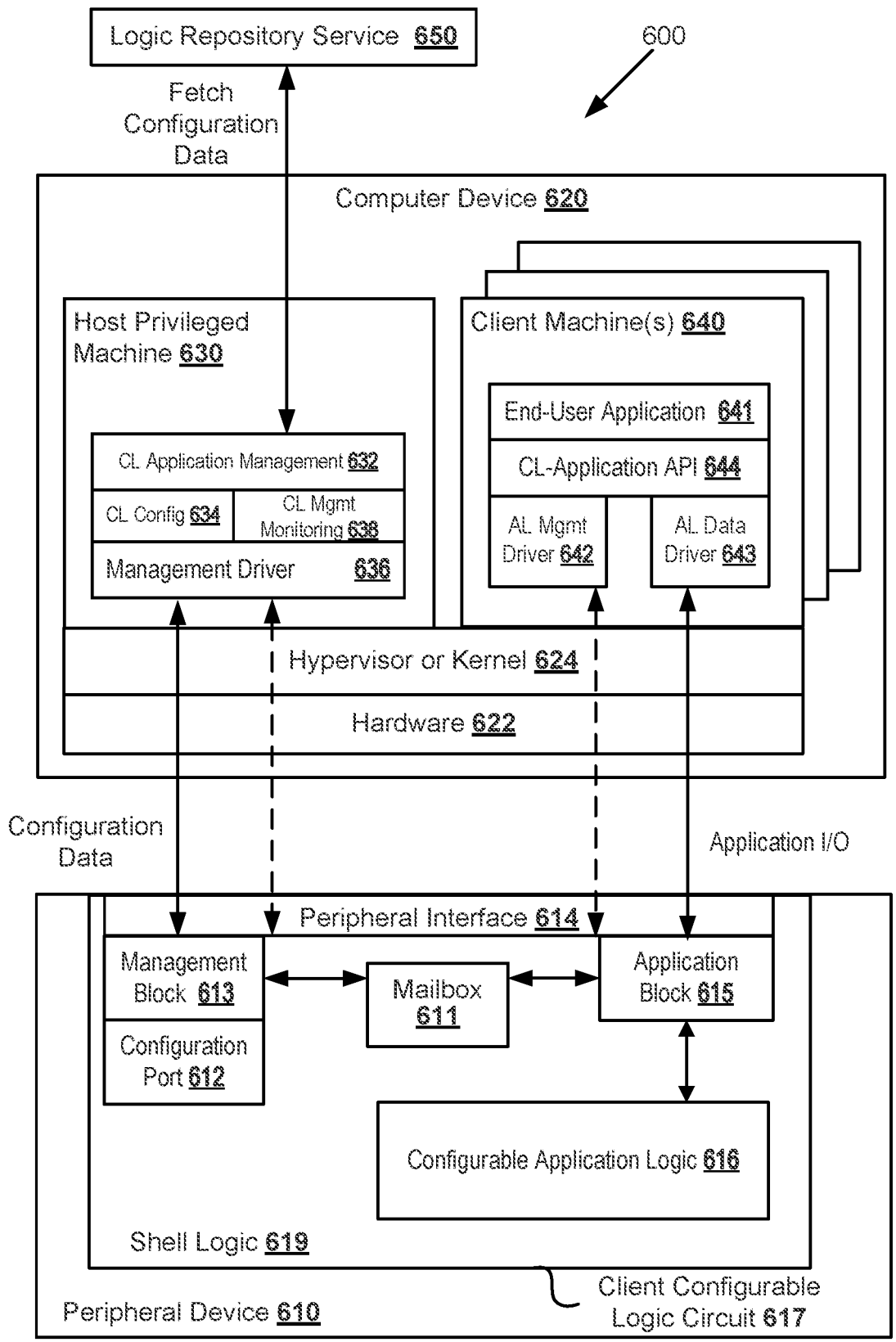
FIG. 6 illustrates an example system according to certain embodiments including a client domain and a host domain.

FIG. 6 illustrates details of an example system 600 including a peripheral device 610. The peripheral device 610 can be connected to a computer device 620 using a local physical interconnect, such as PCIe. In an alternative embodiment, the peripheral device 610 can be integrated within the hardware of the computer device 620. As one example, the computer device 620 can be one of the plurality of computer devices 502A-502B of the compute service provider 500 of FIG. 5.

The computer device 620 can have underlying hardware 622 including one or more CPUs, memory, storage devices, interconnection hardware, etc. The hypervisor or kernel layer 624 can be classified as a type 1 or type 2 hypervisor. A type 1 hypervisor can run directly on the host hardware 622 to control the hardware and to manage guest operating systems. A type 2 hypervisor can run within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A host privileged machine 630 (such as Domain 0 of the Xen hypervisor) can be part of the hypervisor or separated therefrom and generally includes device drivers needed for accessing the hardware 622. Host privileged machine 630 can reside on a host domain wherein client machine(s) 640 can each reside on a client domain with a corresponding client configurable logic circuit 617. Client machine(s) 640 can be logical units of isolation within the hypervisor. Each client machine 640 can be allocated its own portion (e.g., using time or space division) of the hardware layer's memory, CPU allocation, storage, interconnect bandwidth, etc. to the corresponding client domain Additionally, each client machine 640 can include a guest virtual machine and its own guest operating system. As such, each client machine 640 can be an abstract portion of capacity designed to support its own virtual machine independent of the other domains.

The host privileged machine 630 can be used to perform management services for the client machines 640 and the peripheral device 610. The host privileged machine 630 can communicate with web services (such as a deployment service, a logic repository service 650, and a health monitoring service) of the compute service provider, the client machines 640, and the peripheral device 610. The management services can include services for launching and terminating client machines 640, and configuring, reconfiguring, and tearing down the configurable logic of the peripheral device 610. As a specific example, the host privileged machine 630 can launch a new client machine 640 in response to a request from a deployment service (such as the deployment component 426 of FIG. 4). The request can include a reference to an MI and/or a CHI. The MI can specify programs and drivers to load on the client machine 640 and the CHI can specify configuration data to load on the peripheral device 610. The host privileged machine 630 can initialize the client machine 640 based on the information associated with the MI and can cause the configuration data associated with the CHI to be loaded onto the peripheral device 610. The initialization of the client machine 640 and the peripheral device 610 can occur concurrently so that the time to make the instance operational can be reduced.

The host privileged machine 630 can be used to manage programming and monitoring of the peripheral device 610. By using the host privileged machine 630 for this purpose, access to the configuration data a lower privilege levels can be restricted from directly accessing the host privileged machine 630. The configuration ports of the peripheral device 610 can be restricted. Specifically, users with us, the configurable logic cannot be modified without using the infrastructure of the cloud service provider and any third party IP used to program the configurable logic can be protected from viewing by unauthorized users.

The host privileged machine 630 can include a client configurable logic (CL) management module 632 for communicating with web services (such as the logic repository service 650 and a health monitoring service), the peripheral device 610, and the client machines 640. For example, the CL application management module 632 can issue a request to the logic repository service 650 to fetch configuration data in response to a client machine 640 being launched. The CL application management module 632 can communicate with the client machine 640 using shared memory of the hardware 622 or by sending and receiving inter-partition messages over the interconnect connecting the computer device 620 to the peripheral device 610. The messages can include requests by an end-user application 641 to reconfigure or tear-down the peripheral device 610. The CL application management module 632 can issue a request to the logic repository service 650 to fetch configuration data in response to a request to reconfigure the peripheral device 610. The CL application management module 632 can initiate a tear-down sequence in response to a request to tear down the peripheral device 610. The CL application management module 632 can perform watchdog related activities to determine whether the communication path to the client machine 640 is functional.

CL configuration module 634 can access the configuration port 612 (e.g., a configuration access port) of the peripheral device 610 so that client configuration data can be loaded onto the peripheral device 610. For example, the CL configuration layer 634 can send a command or commands to the configuration port 612 to perform a full or partial configuration of the peripheral device 610. The CL configuration module 634 can send the client configuration data (e.g., a bitstream) to the configuration port 612 so that the configurable logic can be programmed according to the client configuration data.

CL configuration module 634 can also configure shell logic 619 used to encompass client configurable logic 616 and isolate the client configurable logic 616 to a user domain with a corresponding client machine 640. As disclosed herein, shell logic 619 can be implemented on a same logic device (e.g., FPGA) as the client configurable logic 616. Shell logic 619 can facilitate interaction between client machine 640 and/or host privileged machine 630 to the client configurable logic 616. Management driver 636 can be used for communicating over the physical interconnect connecting the computer device 620 to the peripheral device 610. The management driver 636 can encapsulate commands, requests, responses, messages, and data originating from the host privileged machine 630 for transmission over the physical interconnect. Additionally, the management driver 636 can de-encapsulate commands, requests, responses, messages, and data sent to the host privileged machine 630 over the physical interconnect. Specifically, the management driver 636 can communicate with the management block 613 of the peripheral device 610. For example, the management block 613 can include physical or virtual function(s) mapped to an address range during an enumeration of devices connected to the physical interconnect. The management driver 636 can communicate with the management block 613 by addressing commands to the address range assigned to the management block 613. Mailbox 611 can be similar to mailbox 390 and can be used to pass data between management block 613 and application block 615 while still maintain domain separation.

The host privileged machine 630 can include a CL management and monitoring module 638. The CL management and monitoring module 638 can monitor and analyze commands occurring on the physical interconnect to determine a health of the peripheral device 610 and/or to determine usage characteristics of the peripheral device 610.

The peripheral device 610 can include non-configurable hard macros and configurable logic. The hard macros can perform specific functions within the peripheral device 610, such as input/output blocks (e.g., serializer and deserializer (SERDES) blocks and gigabit transceivers), analog-to-digital converters, memory control blocks, test access ports, and a configuration port 612. The CL can be programmed or configured by loading configuration data onto the peripheral device 610. For example, the configuration port 612 can be used for loading the configuration data. As one example, configuration data can be stored in a memory (such as a Flash memory) accessible by the configuration port 612 and the configuration data can be automatically loaded during an initialization sequence (such as during a power-on sequence) of the peripheral device 610. Additionally, the configuration port 612 can be accessed using an off-chip processor or an interface within the peripheral device 610.

The peripheral interface logic 614 can include circuitry (e.g., hard macros and/or configurable logic) for signaling on the physical interconnect and implementing a communications protocol. The communications protocol specifies the rules and message formats for communicating over the interconnect. The application block 615 can be used to communicate with drivers of the client machines 640. Specifically, the application block 615 can be a physical or virtual function mapped to an address range during an enumeration of devices connected to the physical interconnect. The application drivers can communicate with the application block 615 by addressing commands to the address range assigned to the application block 615. Specifically, the application block 615 can communicate with a configurable logic management driver 642 to exchange commands, requests, responses, messages, and data. The application block 615 can communicate with a configurable data driver 643 to exchange commands, requests, responses, messages, and data.

The shell logic 619 can shield the interfaces of at least some of the hard macros from the end-users so that the end-users have limited access to the hard macros and to the physical interconnect. For example, the shell logic 619 can include the configuration port 612, the management block 613, the peripheral interface 614, and the application block 615. The end-users can cause the client configurable logic 616 to be loaded on the peripheral device 610, and can communicate with the client configurable logic 616 from the client machines 640 (via the application block 615).

The client machine 640 can include functionality for interfacing an end-user application 641 to the peripheral device 610. Specifically, the client machine 640 can include a CL-Application API 644 for providing the end-user application 641 with access to the peripheral device 610. The CL-Application API 644 can include a library of methods or functions for communicating with the peripheral device 610 and the host privileged machine 630. For example, the end-user application 641 can send a command or data to the client configurable logic 616 by using an API of the CL-Application API 644. In particular, the API of the CL-Application API 644 can interface with the configurable logic (AL) data driver 643 which can generate a command targeted to the application block 615 which can communicate with the client configurable logic 616. In this manner, the end-user application 641 can cause the client configurable logic 616 receive, process, and/or respond with data to potentially accelerate tasks of the end-user application 641. As another example, the end-user application 641 can send a command or data to the host privileged machine 630 by using an API of the CL-Application API 644. In particular, the API of the CL-Application API 644 can interface with the AL management driver 642 which can generate a command targeted to the application block 615. In this manner, the end-user application 641 can cause the host privileged machine 630 to provide operational or data about the peripheral device 610 and/or to request that the client configurable logic 616 be reconfigured.

The client machine 640 in conjunction with the hypervisor or kernel 624 can be used to limit the operations available to perform over the physical interconnect by the end-user application 641. For example, the cloud service provider can provide the AL management driver 642, the AL data driver 643, and the CL-Application API 644 (such as by associating the files with a machine image). These components can be protected from modification by only permitting users and services having a higher privilege level than the end-user to write to the files. The AL management driver 642 and the AL data driver 643 can be restricted to using only addresses within the address range of the application block 615. Additionally, an input/output memory management unit (I/O MMU) can restrict interconnect commands to be within the address ranges of the application block 615 or the management function 613.

Figure 7:
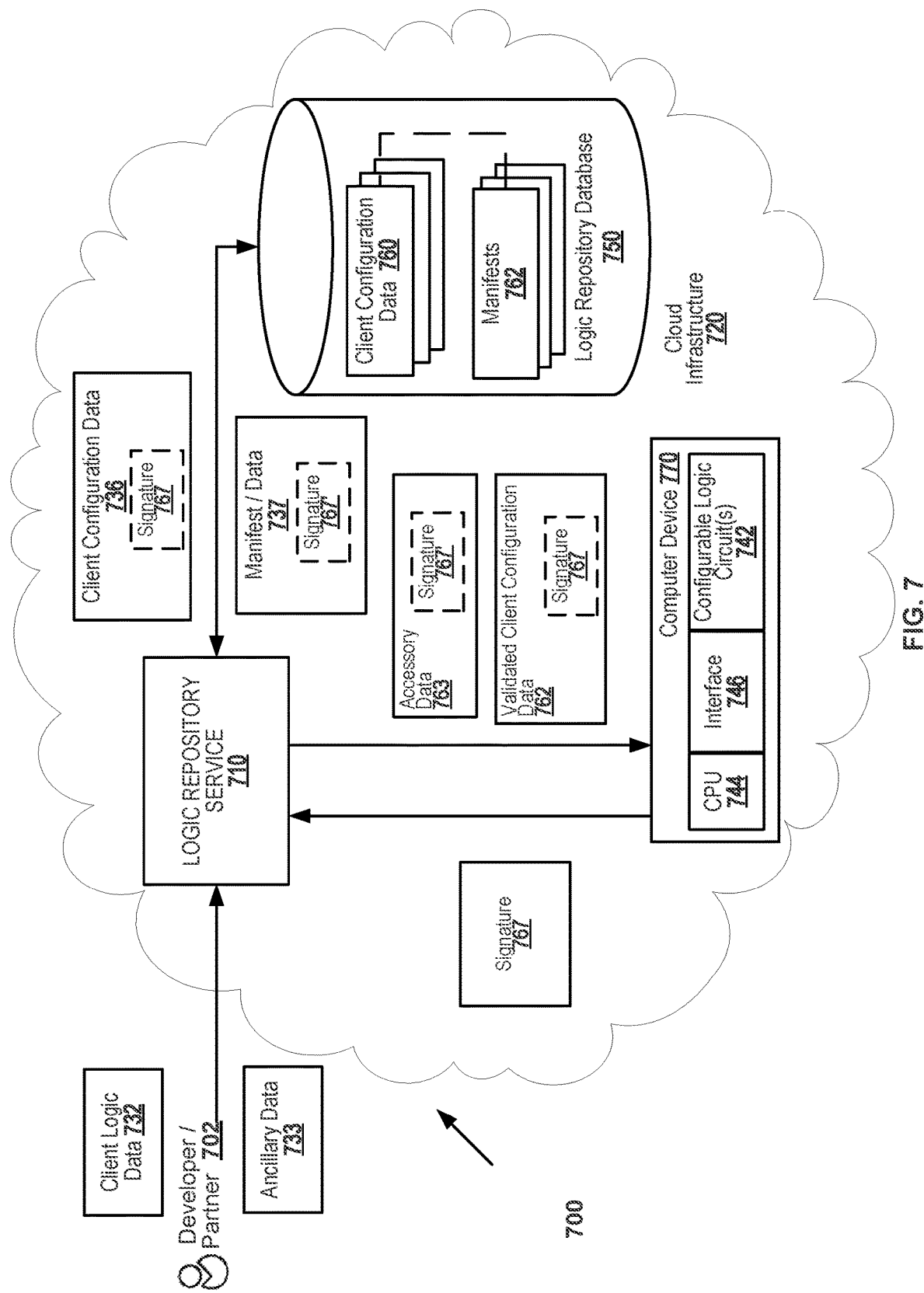
FIG. 7 illustrates a system diagram showing an example of a system including a logic repository service for supplying configuration data to a client configurable logic circuit.

FIG. 7 illustrates a system diagram 700 showing an example of a cloud infrastructure system including a logic repository service for supplying configuration data to a client configurable logic circuit. System 700 can be similar to system 400. Illustrated ii system 700 is a cloud infrastructure system 720 that can receive, from a partner 702 or other client, client logic data 732 that can the form of a binary file or source code for a configuration of a configurable logic circuit(s) 742. Along with the client logic data 732, the cloud infrastructure system 720 may receive ancillary data 733. The ancillary data 733 can take the form of additional data that may be associated with the client logic data 732. For example, the ancillary data 733 may contain client requested configuration data for configurable logic circuit(s) 742 when configured according to client logic data 732 (such as a desired clock speed, for example). Ancillary data 733 may contain an identifier, such as PCIe device identifier, a version of the logic data 732, billing information, customer identification information, or other information. Ancillary data 733 may be presented to partner 702 as a form to be filled out by partner 702. For example, ancillary data 733 may be presented from partner 702 via an extensible markup language (xml) file, via telephone, in person, or through other means.

In certain embodiments, a menu of possible values for variables within ancillary data 733 can be presented to partner 702 for the partner to select one or more of the possible values. For example, various combinations of clock speeds of a logic device of configurable logic circuit(s) 742 may be presented to partner 702. The presented possible clock speeds may be predefined or tested by owners of the cloud infrastructure system 720 to determine which combinations of clock speeds are acceptable or compatible with a given logic device of the cloud infrastructure system 720. In certain embodiments, the presented clock speed(s) may be presented as a tiered values wherein each tier corresponds to a respective level of service that may be provided by the cloud infrastructure system for implementing client logic data 732. For example, each tier may correspond to a performance level that may be tied to a corresponding level of compensation required for implementing the performance level for the client logic data 732. Similarly, different input/output options, logic device(s), device version numbers, compiler version number, priority assignment, etc. may correspond to a performance level.

Sets of client configuration data 760 can be linked to an associated one of manifests 762 in a variety of manners. For example, each of manifests 762 can include a pointer to a linked one sets of client configuration data 760 and vice-versa. In certain embodiments, the data structure used to store sets of client configuration data 760 and manifests 762 can be used to determine links between them. For example, a linked manifest may be a predetermined distance within memory space from the corresponding set of configuration data. A data structure may have pairs of linked containers, each pair including a set of client configuration data and a manifest.

In certain embodiments, a manifest template can be used to generate a completed manifest. The manifest template can include a number of fields that may be populated with information. The fields of the template can be arranged in a certain order and the order may not be user reconfigurable. Thus, a template can provide a standardized shell that can be used for a plurality of sets of client configurable data. The template may include user selected options within each field, in any combination. For example, a field may correspond to a number of clock speeds that a logic device may operate at. The user may be able to select which clock speed they wish to use. As another example, several fields may be linked to a service level that a user may be able to select from a plurality of service values. Depending the service level, clocks, priorities, or other fields within the manifest may be adjusted or set.

Logic repository service module 710 of cloud infrastructure system 720 can receive the client logic data 732 and ancillary data 733 from partner. Logic repository service module 710 can be implemented by, for example, host access device 122 of FIG. 1. Using the client logic data 732 and ancillary data 733, the logic repository service module 710 can generate a corresponding manifest 737 and client configuration data 736. Client configuration data 736 can be similar to client configuration data 436. The manifest 737 can contain data corresponding to the client configuration data 736. Logic repository database 750 can include various sets of client configuration data 760 each associated with a manifest 762. The sets stored within logic repository database 750 can correspond to any number of clients of cloud infrastructure system 720, in any combination. In certain embodiments, a manifest can be human-readable and received from a partner, for example. Information can be provided to the partner in a menu format for the partner to select one from a discrete number of selectable options for each of several attributes. Data can be generated from the information and that data may be machine-readable. For example, data may contain a value of a register to set a clock speed. A value of an attribute within a manifest can be populated with the value of the register.

In certain embodiments, logic repository service 710 may compile source code provided by partner 702 to generate client configuration data 736. Client configuration data 736 can be compiled to include a signature value. The signature can be used to verify that the intended client configuration data was used to configure configurable logic circuit(s), as will be further explained herein. In certain embodiments, logic repository service 710 may receive, from partner 702, precompiled hardware device image(s) that may each contain a respective signature.

Manifest 737 can include several attributes. For example, the following is a non-exhaustive list of attributes that may be included in manifest 737:

manifest_format_version can include a version number of the manifest to support future versions;

pci_vendor_id can include a vendor identifier for use with PCI identification of a configuration of client configurable logic;

pci_device_id can include a device identifier for use with PCI identification of a configuration of client configurable logic;

pci_subsystem_id can include a subsystem identifier for use with PCI identification of a configuration of client configurable logic;

pci_subsystem_vendor_id can include a subsystem and vendor identifier for use with PCI identification of a configuration of client configurable logic;

dcp_hash can include an expected hash or checksum value to verify a configuration of client configurable logic. An example can be an sha256sum value;

shell_version can include a version of shell logic compatible with a client configurable logic configuration;

dcp_file_name can include a filename or other identifier of the corresponding client configurable logic configuration;

hdk_version can include a hardware configuration version of compatible hardware configurable logic for client configuration data;

date can include a data that the corresponding client configuration data was created, for example;

clock_recipe can include an identifier indicated one or more clocks to configure a logic device to be configured using the corresponding client configuration data; and CL_signature can include a unique signature for the corresponding client configuration data.

Certain logic devices may include one or more clock islands or domains. For example, certain FPGAs may include register(s) that may be configure the FPGA to operate at corresponding clock(s) depending on the configuration of the register(s). Manifest 737 may include a value to populate the register(s) to setup a logic device to operate at desired clock values. Certain logic devices may be driven by an external clock in order to set their operating frequency (or frequencies). Still other logic devices may include a combination of register(s) and externally provided clock(s). Manifest 737 may include desired clock frequenc(ies) and/or register values for certain logic devices in any combination.

When a certain configuration of client configurable logic within configurable logic circuit(s) 742 is requested (such as by a client of cloud infrastructure system 720), logic repository service 710 can provide validated client configuration data 762 (which may be a validated binary of the desired configuration of a programmable logic device) and accessory data 763. Accessory data 763 can be similar to manifest 737 and/or may be generated using manifest 737. For example, manifest 737 may be logic device agnostic. As one example, manifest 737 may include desired frequenc(ies). Logic repository service 710, having knowledge of a target logic device, may generate register value(s) within accessory data 763 corresponding to the desired frequenc(ies). Logic repository service 710 can provide accessory data 763 to computer device 770. CPU 744 and/or component(s) of client configurable logic circuit(s) 742 may configure programmable logic device(s) to operate at frequenc(ies) specified by accessory data 763.

As disclosed, client logic data 732, client configuration data 736, and/or validated client configuration data 762 may include a signature therein. The signature may be output by a logic device after configured according to the corresponding validated client configuration data 762 and/or may be read from the logic device after configured. Signature 767 is provided as an example signature output by configurable logic circuit(s) 742 post configuration. Signature 767' can match or otherwise correspond to signature 767 and can be stored as data accompanying corresponding client configuration data. Logic repository service may also provide accessory data 763 that may include, for example, a signature that a corresponding validated client configuration data 762 is expected to output. The signature 767' provided via accessory data 763 can be matched against a signature 767 embedded within the configurable logic circuit(s) 742 due to being configured using validated client configuration data 762. For example, CPU 744 and/or logic repository service 710 may verify that configurable logic circuit(s) 742, post configuration output or contain the expected signature. If not, it could indicate that the configurable logic circuit(s) 742 were configured using the incorrect client configuration data and/or the configuration become corrupted. If so, then a new image may loaded into the configurable logic circuit(s) 742 and/or various other corrective actions may be performed.

In certain embodiments, a signature can be used to verify integrity of corresponding client configuration data (such as a client bitstream or image). For example, the signature may be embedded within the client bitstream or image such that when a hardware device is correctly configured with the client bitstream or image, the hardware device will output or otherwise make available the signature. In this manner, the signature can act as a checksum. If the hardware device is incorrectly configured (for example, an incorrect gate is configured or an incorrect interconnection is configured), the signature may become corrupted. Thus, the signature may be used to validate that a specific hardware configuration of a hardware device matches an intended configuration.

Computer device 770 includes CPU 744, interface 746, and configurable logic circuit(s) 742 that may corresponding respectively to CPU 222, host interface 226, and client configurable logic circuit 225. Client configurable logic circuit 225 can include one or more host physical logic devices (e.g., FPGAs) that may communicate with CPU 744 via interface 746. Interface 746 may be a PCI or similar interface in which configurable logic circuit(s) 742 may present themselves as one or more devices on interface 746 using, for example, a vendor, device, or subsystem identifier, in any combination. The identifier may be used to a corresponding virtual machine to load driver(s) for communicating with the configurable logic circuit(s), for example. These drivers can be similar to management driver 642 and/or data driver 643 of FIG. 6. However, the identifier(s) of the host physical logic device (e.g., FPGA) may be presented via interface 746. Thus, unintended driver(s), or no drivers, may be loaded by a client virtual machine communicating with configurable logic circuit(s) 742 as the identifier of the host physical logic device may be provided instead of the client hardware device configured within the host physical logic device.

In certain embodiments, a hypervisor of computer device 770 (now shown), that may be similar to hypervisor 624 may intercept identifier(s) provided to a client virtual machine and provide, to the client virtual machine, identifier(s) specific in accessory data 763 (and/or manifest 737). The interception can include identifying that a client device has requested an identifier from a logic device, preventing a host logic device from responding, and/or providing client identifier(s) to the client virtual machine. In certain embodiments, the hypervisor may populate specified addresses within PCI configuration space using the client identifier(s).

Figure 8:
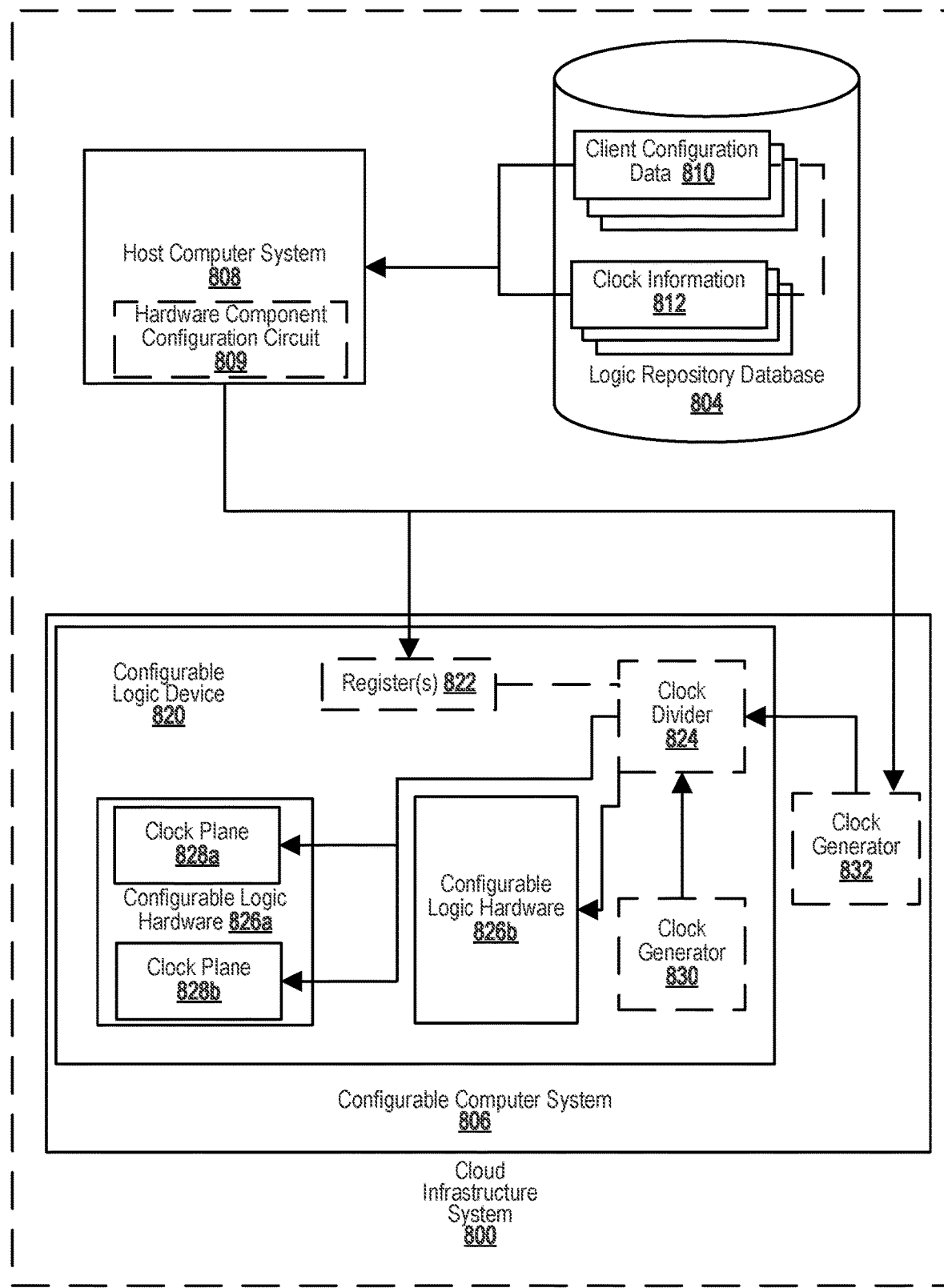
FIG. 8 illustrates an example system diagram illustrating clock features of the disclosure.

FIG. 8 illustrates an example cloud infrastructure system 800 that can be similar to cloud infrastructure system 720. Cloud infrastructure system 800 can include a logic repository database 804, a configurable computer system 806, and a host computer system 808. Logic repository database 804 can be similar to logic repository database 750. Host computer system 808 can be similar to computer device 220 and can be used to implement logic repository service 710. Host computer system 808 can reside within a host domain of cloud infrastructure system 800. Configurable computer system 806 can be similar to computer device 770. Host computer system 800 can be operable to retrieve, from logic repository database 804, set(s) of client configuration data 810 and corresponding clock information 812. Clock information can be stored within manifests 762, for example. While stored in logic repository database 804, each set of client configuration data 810 can be associated with a corresponding set of clock information 812. Clock information may also be embedded within client configuration data 810 or otherwise stored as metadata associated with client configuration data 810. Clock information may also be generated by host computer system 808 upon retrieving a set of client configuration data.

Upon retrieving client configuration data and corresponding clock information, Host computer system can send one or more commands for configurable computer system 806 to configure configurable logic hardware contained therein. Configurable computer system 806 can include one or more programmable logic devices or similar devices as disclosed herein to implement configurable logic hardware, such as configurable logic hardware 826a and 826b. Configurable logic hardware 826a and 826b can be part of a same logic device or portioned between any number of logic devices. Configurable logic hardware 826a or 826b can be configured based upon one or more commands from host computer system 808. Furthermore, configurable logic hardware 826a or 826b can be included within a client domain hosted by cloud infrastructure system 800.

Although host computer system 808 is illustrated as being separate from configurable computer system 806, they can be included within one computer system. Host computer system 808 can include hardware component configuration circuit 809 that can be configured to setup a clock rate that configurable logic hardware 826a or 826b operates at when configured with client configuration data. Hardware component configuration circuit 809 can be included within configurable computer system 806. Hardware component configuration circuit 809 can interact with hardware component(s) of configurable computer system 806 to set a clock rate that configurable logic hardware 826a or 826b operate at. For example, hardware component configuration circuit 809 can configure clock generator 830 or clock generator 832 to generate specified clock frequenc(ies). Clock generator 830 or clock generator 832 can include a phased lock look (PLL), an oscillator (e.g., a crystal oscillator), or similar components to generate clock frequencies at one or more frequencies. The clock signal generated by clock generator 830 or clock generator 832 can be a square wave, sine wave, saw wave, or other signal.

Configurable logic device 820 can, in certain embodiments, be a programmable logic device or an FPGA. Clock generator 832 can be external to configurable logic device 820 and provide a clock signal to configurable logic device 820. Configurable logic device 820 can, based on a clock signal received from clock generator 832, operate at one or more clock frequencies. In certain embodiments, clock generator 830 can be included within configurable logic device 832. Clock generator 830 can be a dedicated circuit for clock signal generation, such as via a PLL and/or via a block of configurable logic contained within configurable logic device. In certain embodiments, configurable logic device 820 can include one or more registers 822. Register(s) can be used to configure configurable logic device 820 to operate at one or more frequencies. For example, a value of register(s) 822 can be written to in order to configure clock generator 830 to generate clock frequenc(ies).

Clock divider 824 can be included within configurable logic device 820 and can be configured to multiple or divide a clock signal generated by or received by configurable logic device 820. For example, clock divider 824 may be configured to double or half a clock rate (e.g., frequency) of a clock signal generated by clock generator 832. A value that clock divider 824 multiplies or divides a clock signal by can be selected based upon value(s) of register(s) 822.

In certain embodiments, configurable logic hardware of configurable logic device 820 can be partitioned into a plurality of clock planes. For example, configurable logic hardware 826a is illustrated as including clock plane 828a and clock plane 828b. Each of clock planes 828a and 828b may operate at differing frequencies. The differing frequencies may be determined by providing a clock signal to each of clock plane 828a and clock plane 828b. The clock signals can be generated by one or more clock generators (such as clock generators 830 and/or 832) or by clock divider 824. In certain embodiments, clock divider 824 may receive a single clock signal and multiply and/or divide the single clock signal to output several clock signals (which can be provided to define different clock planes). Although not illustrated, clock planes can be shared between multiple sets of client configurable logic hardware and/or other configurable hardware of configurable logic device 820.

In certain embodiments, each of clock planes 828a and 828b can be configured according to a clock recipe included within clock information 812. The recipe can include a plurality of clock values each corresponding to a respective clock planes (such as planes 828a and 828b). A clock recipe can be selected based on a type of device, a device manufacturer, a model of device, a version of device, and/or a service level that may correspond to a client (or corresponding client configuration data). For example, a user may select from among a plurality of service levels wherein each level may provide a different level of performance. A recipe can include a plurality of clock rates corresponding to each of the different service levels. The recipes may be references by a value within clock information (e.g., one field within clock information may include a value corresponding to a one of several recipes where each of the several recipes includes several clock rates).

In certain embodiments, a clock rate of configurable logic device 820 can be modified or generated during runtime (e.g., after a configurable logic hardware has been configured according to a set of client configuration data). Modification or generation of a clock signal can be performed by modifying value(s) of register(s) 822, providing a signal to a hardware component (such as clock generator 830, clock generator 832, and/or configurable logic device 820, or through other means). In certain embodiments, a clock signal can be generated or modified depending on configurable computer system 806 runtime parameters. For example, a clock signal can be modified to enable lower power usage by configurable logic device 820 and/or lower thermal output by configurable logic device 820. For example, thermal output of configurable logic device 820 can be monitored and, if the thermal output exceeds a threshold, a clock signal of configurable logic device can be modified (and/or a corresponding voltage required to maintain stability for the clock signal). As another example, a heat dissipation system or power delivery system of configurable computer system 806 can be monitored and, if a threshold thermal dissipation is met and/or a threshold power usage threshold is met, a clock speed of configurable logic device 802 can be modified. Clock information can include information for dynamic adjustment of a clock signal during runtime. For example, various clock offsets can be included within the clock information corresponding to various environmental factors or other. Other examples of dynamic clock adjustment can include throttling in order to react to system loading, data bus saturation, power costs (e.g., electrical power may cost less at certain times of day), changes in client service level(s), a determination of a number of hardware logic devices used to implement client logic and/or a number of clients accessing the hardware logic devices, etc.

In certain embodiments, instead of providing a direct command to a hardware component for the component to modify or generate a clock rate, an ancillary value of the component can be altered. For example, a configurable thermal design parameter of a component can be modified that correlates to a change in clock rate and/or voltage to sustain a clock rate. For example, configurable logic device 820 may be commanded to operate within a 15 W, 10 W, 5 W, or other thermal design envelope. In certain embodiments a clock frequency can be synchronized across various components according to clock information corresponding to a set of client configuration data in order to, for example, improve data integrity between the various components (e.g., via communications between the components and/or parallel operations performed between the components).

Figure 9:
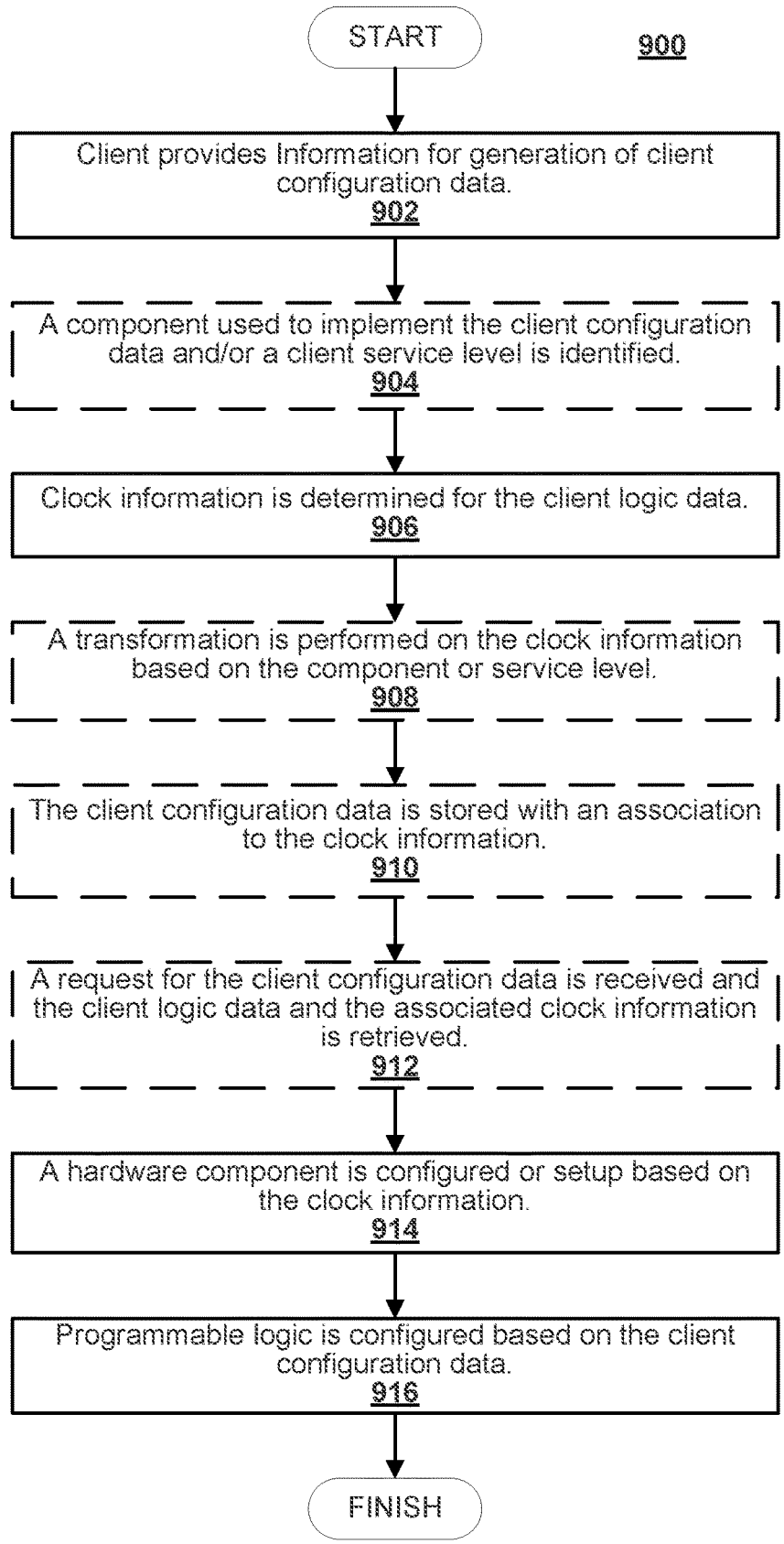
FIG. 9 illustrates an example flowchart implementing certain features of the system of FIG. 7 or FIG. 8.

FIG. 9 illustrates a flowchart 900 including features of the disclosure according to certain embodiments. Features of flowchart 900 can be utilized by the system 700 illustrated in FIG. 7. At 902, a client can provide information for generation of client configuration data. For example, the client can provide source code, binary code, a selection of features to be implemented, or a combination of the preceding. At 904, a component can optionally be identified to implement (e.g., be configured by) the client configuration data. For example, a model, type, or manufacturer of component can be identified that may be used to implement the client configuration data. The client configuration data may be validated and/or otherwise be approved for use with certain hardware components (e.g., logic devise). The approved hardware components can be approved for certain configuration(s) of clock rate(s). Furthermore, each component can be associated with a corresponding set of clock rate(s) depending on a service level of the user. For example, a user having a relatively high service level may be able to operate a first hardware component at a first clock rate and a second hardware component at a second clock rate.

At 906, clock information can be determined for the client logic data. As disclosed herein, the clock information can correspond to one or more clock rates for the client configuration data to operate at. The clock information can include absolute clock rate(s), register value(s) to implement certain clock rate(s), clock rate(s) depending on operational conditions (e.g., thermal or power design constraints), and/or ancillary value(s) corresponding to a clock rate. The clock information can be derived depending on a hardware component used to implement the client configuration data. The clock information can be determined by logic repository service 710, for example.

At 908, a transformation can be performed on the clock information based on a component used to implement the client configuration data and/or a service level associated with a client and/or client configuration data. For example, the transformation can be used to transform a clock rate into a register value utilized by a certain hardware component to generate the desired clock rate. The transformation can be performed to obtain several pieces of information each corresponding to hardware component and/or service level, for example. Thus, as a client's service level changes, a different set of clock information can be selected without repopulating/generating the clock information. The transformation can be used to modify a baseline set of clock information to be operable across a variety of components/conditions.

At 910, the client configuration data can be stored with an association to the clock information. For example, the client configuration data can be stored as an image within a repository system (e.g., logic repository database 804) with corresponding clock information/a manifest. At 912, a request for the client configuration data can be received and, based on identifying the client configuration data within the repository, selecting the corresponding clock information. At 914 a hardware component can be configured or setup based on the clock information. As disclosed herein the hardware component can be a clock generator, logic device, or similar. The setup or configuration can include writing to a register of the component, sending a signal to the component, or otherwise modifying the component. At 916, programmable logic coupled to the component can be configured based on the client configuration data. As disclosed herein, 914 and 916 can be performed in any order. That is to say, the client configured programmable logic hardware can be setup prior to configuration by client configuration data or at runtime.

Figure 10:
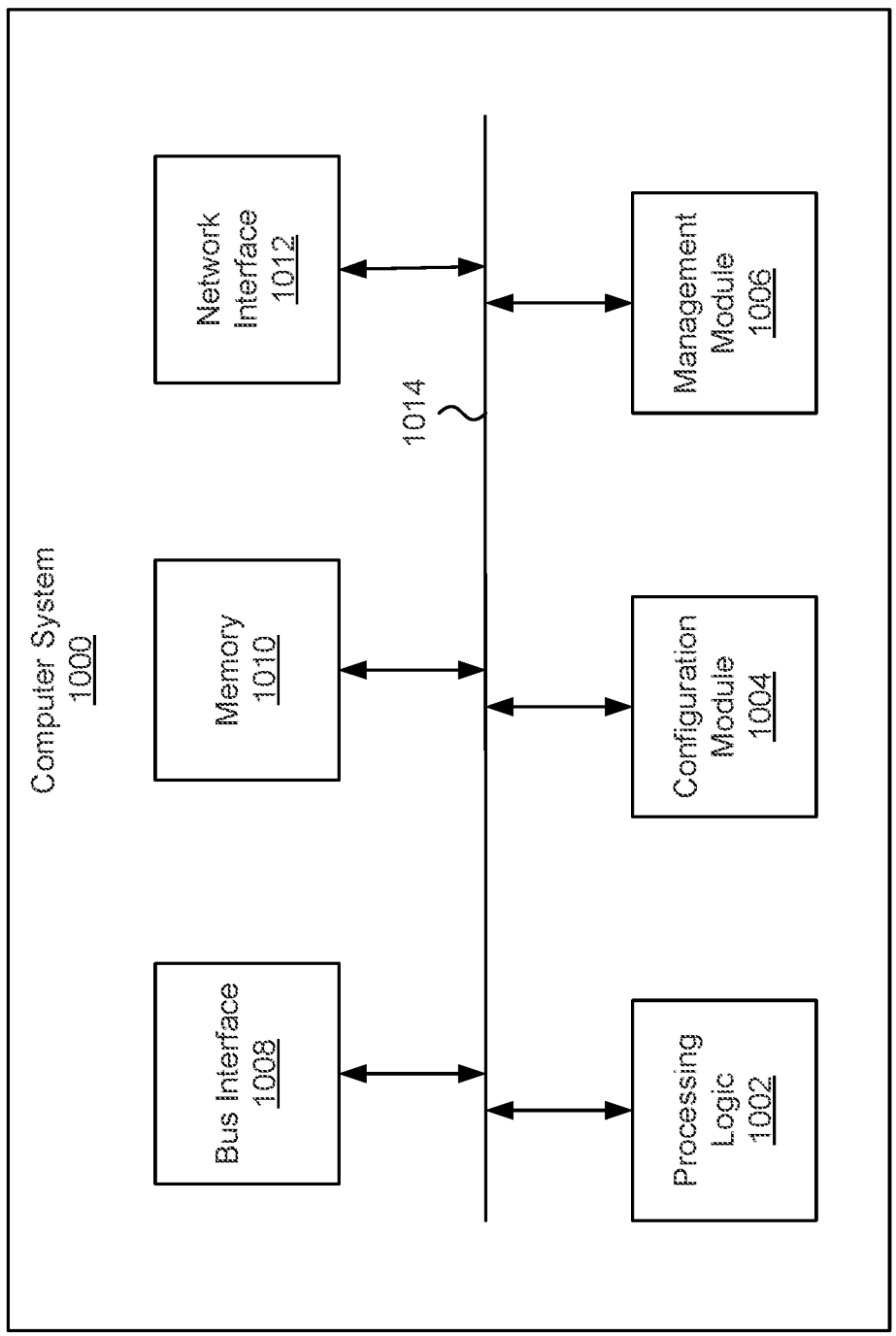
FIG. 10 illustrates an example environment of a computer system for implementing aspects in accordance with some embodiments.

FIG. 10 illustrates an example of a computer system 1000. Functionality and/or several components of the computer system 1000 may be used without limitation with other features disclosed elsewhere in this disclosure, without limitations.

In certain examples, the computer system 1000 may include processing logic 1002, a configuration module 1004, a management module 1006, a bus interface module 1008, memory 1010, and a network interface module 1012. These modules may be hardware modules, software modules, or a combination of hardware and software. In certain instances, modules may be interchangeably used with components or engines, without deviating from the scope of the disclosure. The computer system 1000 may include additional modules, not illustrated here, such as components discussed with respect to the nodes disclosed in FIG. 10. In some implementations, the computer system 1000 may include fewer modules. In some implementations, one or more of the modules may be combined into one module. One or more of the modules may be in communication with each other over a communication channel 1010. The communication channel 1010 may include one or more busses, meshes, matrices, fabrics, a combination of these communication channels, or some other suitable communication channel.

The processing logic 1002 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1010.

The memory 1010 may include either volatile or non-volatile, or both volatile and non-volatile types of memory. The memory 1010 may, for example, include random access memory (RAM), read only memory (ROM), Electrically Erasable Programmable Read-Only Memory (EEPROM), flash memory, and/or some other suitable storage media. In some cases, some or all of the memory 1010 may be internal to the computer system 1000, while in other cases some or all of the memory may be external to the computer system 1000. The memory 1010 may store an operating system comprising executable instructions that, when executed by the processing logic 1002, provides the execution environment for executing instructions providing networking functionality for the computer system 1000. The memory may also store and maintain several data structures and routing tables for facilitating the functionality of the computer system 1000.

In some implementations, the configuration module 1004 may include one or more configuration registers. Configuration registers may control the operations of the computer system 1000. In some implementations, one or more bits in the configuration register can represent certain capabilities of the computer system 1000. Configuration registers may be programmed by instructions executing in the processing logic 1002, and/or by an external entity, such as a host device, an operating system executing on a host device, and/or a remote device. The configuration module 1004 may further include hardware and/or software that control the operations of the computer system 1000.

In some implementations, the management module 1006 may be configured to manage different components of the computer system 1000. In some cases, the management module 1006 may configure one or more bits in one or more configuration registers at power up, to enable or disable certain capabilities of the computer system 1000. In certain implementations, the management module 1004 may use processing resources from the processing logic 1002. In other implementations, the management module 1006 may have processing logic similar to the processing logic 1002, but segmented away or implemented on a different power domain than the processing logic 1002.

The bus interface module 1008 may enable communication with external entities, such as a host device and/or other components in a computing system, over an external communication medium. The bus interface module 1008 may include a physical interface for connecting to a cable, socket, port, or other connection to the external communication medium. The bus interface module 1008 may further include hardware and/or software to manage incoming and outgoing transactions. The bus interface module 1008 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1008 may include the physical layer for any of these bus protocols, including a connector, power management, and error handling, among other things. In some implementations, the computer system 1000 may include multiple bus interface modules for communicating with multiple external entities. These multiple bus interface modules may implement the same local bus protocol, different local bus protocols, or a combination of the same and different bus protocols.

The network interface module 1012 may include hardware and/or software for communicating with a network. This network interface module 1012 may, for example, include physical connectors or physical ports for wired connection to a network, and/or antennas for wireless communication to a network. The network interface module 1012 may further include hardware and/or software configured to implement a network protocol stack. The network interface module 1012 may communicate with the network using a network protocol, such as for example TCP/IP, Infiniband, RoCE, Institute of Electrical and Electronics Engineers (IEEE) 802.9 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computer system 1000 may include multiple network interface modules, each configured to communicate with a different network. For example, in these implementations, the computer system 1000 may include a network interface module for communicating with a wired Ethernet network, a wireless 802.9 network, a cellular network, an Infiniband network, etc.

The various components and modules of the computer system 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 10.

Figure 11:
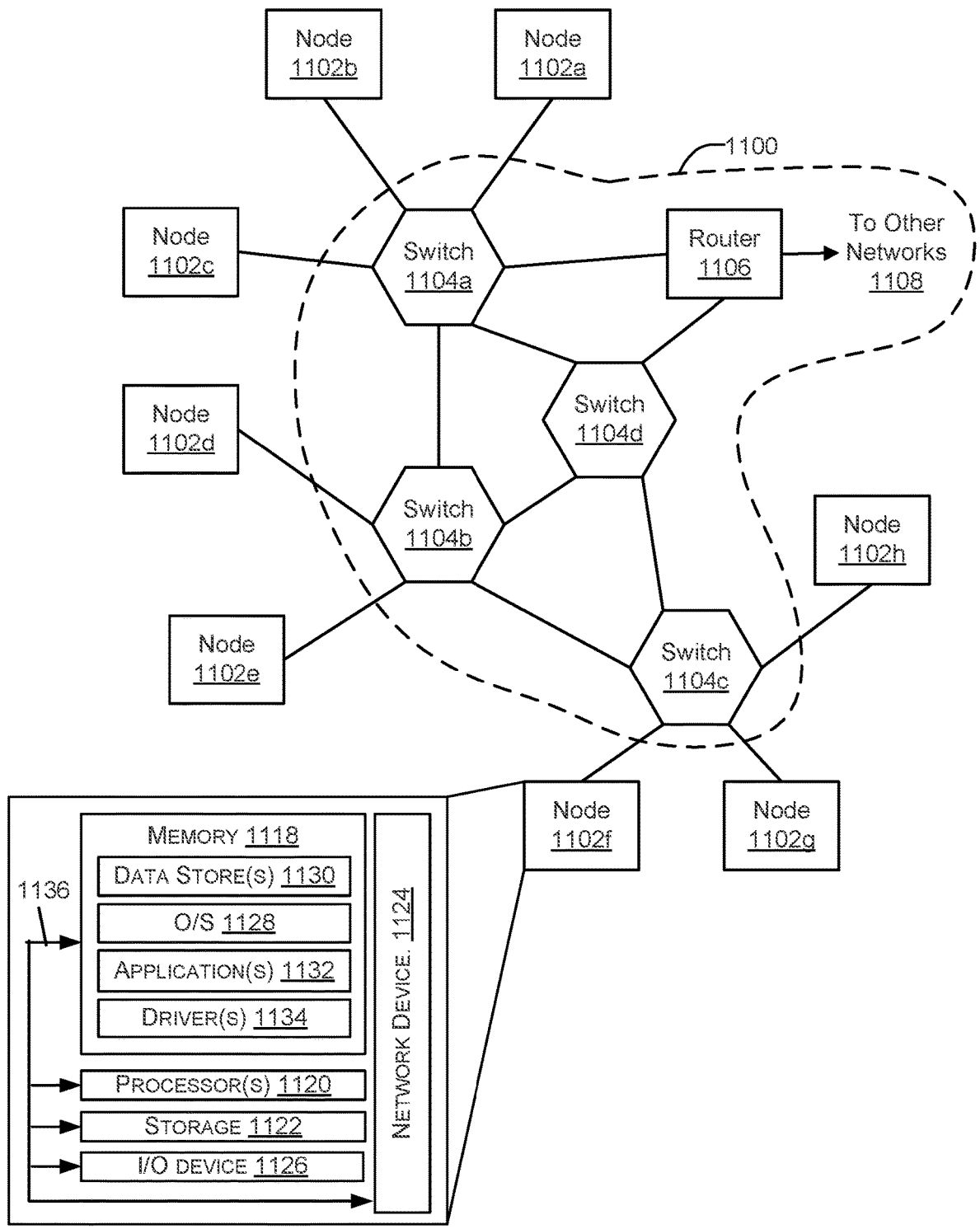
FIG. 11 illustrates an example architecture for features and systems described herein that includes one or more service provider computers and/or a user device connected via one or more networks, according to some embodiments.

FIG. 11 illustrates a network 1100, illustrating various different types of network devices 1000 of FIG. 10, such as nodes comprising the network device, switches and routers. Network 1100 can form a network infrastructure that can be used to implement a service provider network (e.g., cloud provider network). In certain embodiments, the network 1100 may be based on a switched architecture with point-to-point links. As illustrated in FIG. 11, the network 1100 includes a plurality of switches 1104a-1004d, which may be arranged in a network. In some cases, the switches are arranged in a multi-layered network, such as a Clos network. Switches generally operate at the data link layer (layer 2) and sometimes the network layer (layer 3) of the Open System Interconnect (OSI) Reference Model and may support several packet protocols. Switches 1104a-1004d may be connected to a plurality of nodes 1102a-1002h and provide multiple paths between any two nodes.

The network 1100 may also include one or more network devices 1000 for connection with other networks 1108, such as other subnets, LANs, wide area networks (WANs), or the Internet, and may be referred to as routers 1106. Routers use headers and forwarding tables to determine the best path for forwarding the packets, and use protocols such as internet control message protocol (ICMP) to communicate with each other and configure the best route between any two devices.

In some examples, network(s) 1100 may include anyone or a combination of many different types of networks, such as cable networks, the Internet, wireless networks, cellular networks and other private and/or public networks. Interconnected switches 1104a-1004d and router 1106, if present, may be referred to as a switch fabric, a fabric, a network fabric, or simply a network. In the context of a computer network, terms "fabric" and "network" may be used interchangeably herein.

Nodes 1102a-1102h may be any combination of host systems, processor nodes, storage subsystems, and I/O chassis that represent user devices, service provider computers or third party computers. Any of nodes 1102a-1102h can be or include functionality of computer system 1000.

User devices may include computing devices to access an application 1132 (e.g., a web browser or mobile device application). In some aspects, the application 1132 may be hosted, managed, and/or provided by a computing resources service or service provider. The application 1132 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1108. Additionally, the user device(s) may be part of the distributed system managed by, controlled by, or otherwise part of the service provider computer(s) (e.g., a console device integrated with the service provider computers).

The node(s) of FIG. 11 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1132 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1102*a*-1102*h* may include at least one memory 1118 and one or more processing units (or processor(s) 1120). The processor(s) 1120 may be implemented in hardware, computer-executable instructions, firmware, or combinations thereof. Computer-executable instruction or firmware implementations of the processor(s) 1120 may include computer-executable or machine-executable instructions written in any suitable programming language to perform the various functions described.

In some instances, the hardware processor(s) 1120 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1118 may store program instructions that are loadable and executable on the processor(s) 1120, as well as data generated during the execution of these programs. Depending on the configuration and type of the node(s) 1102*a*-1102*h*, the memory 1118 may be volatile (such as RAM) and/or non-volatile (such as ROM, flash memory, etc.). The memory 1118 may include an operating system 1128, one or more data stores 1130, one or more application programs 1132, one or more drivers 1134, and/or services for implementing the features disclosed herein.

The operating system 1128 may support nodes 1102*a*-1102*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1128 may also be a proprietary operating system.

The data stores 1130 may include permanent or transitory data used and/or operated on by the operating system 1128, application programs 1132, or drivers 1134. Examples of such data include web pages, video data, audio data, images, user data, and so on. The information in the data stores 1130 may, in some implementations, be provided over the network(s) 1108 to user devices 1104. In some cases, the data stores 1130 may additionally or alternatively include stored application programs and/or drivers. Alternatively or additionally, the data stores 1130 may store standard and/or proprietary software libraries, and/or standard and/or proprietary application user interface (API) libraries. Information stored in the data stores 1130 may be machine-readable object code, source code, interpreted code, or intermediate code.

The drivers 1134 include programs that may provide communication between components in a node. For example, some drivers 1134 may provide communication between the operating system 1128 and additional storage 1122, network device 1124, and/or I/O device 1126. Alternatively or additionally, some drivers 1134 may provide communication between application programs 1132 and the operating system 1128, and/or application programs 1132 and peripheral devices accessible to the service provider computer. In many cases, the drivers 1134 may include drivers that provide well-understood functionality (e.g., printer drivers, display drivers, hard disk drivers, Solid State Device drivers). In other cases, the drivers 1134 may provide proprietary or specialized functionality.

The service provider computer(s) or servers may also include additional storage 1122, which may include removable storage and/or non-removable storage. The additional storage 1122 may include magnetic storage, optical disks, solid state disks, flash memory, and/or tape storage. The additional storage 1122 may be housed in the same chassis as the node(s) 1102*a*-1102*h* or may be in an external enclosure. The memory 1118 and/or additional storage 1122 and their associated computer-readable media may provide non-volatile storage of computer-readable instructions, data structures, program modules, and other data for the computing devices. In some implementations, the memory 1118 may include multiple different types of memory, such as SRAM, DRAM, or ROM.

The memory 1118 and the additional storage 1122, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1118 and the additional storage 1122 are examples of computer storage media.

Additional types of computer storage media that may be present in the node(s) 1102a-1102h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1102a-1102h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1102a-1102h may also include I/O device(s) 1126, such as a keyboard, a mouse, a pen, a voice input device, a touch input device, a display, speakers, a printer, and the like. The node(s) 1102a-1102h may also include one or more communication channels 1136. A communication channel 1136 may provide a medium over which the various components of the node(s) 1102a-1102h can communicate. The communication channel or channels 1136 may take the form of a bus, a ring, a switching fabric, or a network.

The node(s) 1102a-1102h may also contain network device(s) 1126 that allow the node(s) 1102a-1102h to communicate with a stored database, another computing device or server, user terminals and/or other devices on the network(s) 1100. The network device(s) 1124 of FIG. 11 may include similar components discussed with reference to the network device 900 of FIG. 9.

In some implementations, the network device 1126 is a peripheral device, such as a PCI-based device. In these implementations, the network device 1126 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1108 may implement NVMe, and the network device 1126 may be connected to a computing system using a PCIe interface.

A PCI-based device may include one or more functions. A "function" describes operations that may be provided by the network device 1126. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1126 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, FIG. 11, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:
   networked computer devices organized into domains, wherein the domains include:
      a client domain; and
      a host domain;
   wherein a peripheral device coupled to the computer devices includes:
      a programmable logic device;
      a client logic circuit in the programmable logic device, the client logic circuit included in the client domain, the client logic circuit being implemented based on the programmable logic device being configured according to client configuration data, wherein the programmable logic device is coupled to a virtual machine residing in the client domain;
      a shell logic circuit in the programmable logic device, the shell logic circuit included in the host domain, wherein the shell logic circuit encapsulates the client logic circuit; and
      a hardware component configuration circuit configured to:
         obtain, from a logic repository and based on the client configuration data used to configure the programmable logic device, clock information corresponding to the client configuration data, wherein the clock information includes a plurality of clock configurations for the programmable logic device configured according to the client configuration data, and wherein the clock information is included in a corresponding manifest stored in the logic repository that stores different client configuration data and corresponding manifests, wherein the different client configuration data represent different logic circuits to be implemented;
         select a clock configuration from the plurality of clock configurations included in the clock information; and
         store a value extracted from the selected clock configuration at a register to dynamically update a clock rate of the programmable logic device during runtime.

2. The system of claim 1, further comprising an oscillator configured to provide a clock signal to the programmable logic device based on the value stored at the register.

3. The system of claim 2, wherein the oscillator is external to the programmable logic device.

4. The system of claim 2, wherein the oscillator provides a clock signal to two programmable logic devices based on the value stored at the register, including the programmable logic device.

5. The system of claim 2, wherein the oscillator is included within the programmable logic device.

6. A system, comprising:
   a client configurable logic circuit, wherein the client configurable logic circuit is implemented in programmable logic hardware that is configured according to client configuration data, wherein the programmable logic hardware resides within a client domain;
   a hardware interface;
   a shell logic circuit coupled to the client configurable logic circuit and the hardware interface, wherein the shell logic circuit resides within a host domain and the shell logic circuit is configured to prevent the programmable logic hardware from accessing the hardware interface except through the shell logic circuit;
   a hardware component coupled to the programmable logic hardware; and
   a hardware component configuration circuit configured to:
      obtain, from a logic repository and based on the client configuration data, clock information corresponding to the client configuration data, wherein the clock information includes a plurality of clock configurations for the programmable logic hardware configured according to the client configuration data, wherein the clock information is included in a corresponding manifest stored in the logic repository that stores different client configuration data and corresponding manifests, and wherein the different client configuration data represent different logic circuits to be implemented;
select a clock configuration from the plurality of clock configurations included in the clock information; and
store a value extracted from the selected clock configuration at a register to dynamically update a clock rate of the hardware component during runtime to operate at a clock rate based on the clock information.

7. The system of claim 6, wherein the hardware component includes clock planes that, in response to being configured by the hardware component configuration circuit based on the clock information, operate at respective clock frequencies.

8. The system of claim 6, wherein the client configuration data is one of multiple sets of client configuration data and wherein each of the sets of client configuration data corresponds to respective clock information.

9. The system of claim 8, wherein the multiple sets of client configuration data each corresponds to each clock information of multiple sets of clock information for configuring multiple clock planes, each of the clock planes operating at a respective clock rate.

10. The system of claim 6, wherein the clock rate is determined based on a service level corresponding to the respective client configuration data.

11. The system of claim 6, wherein the clock information corresponds to a group of hardware components, wherein each of the group of hardware components is configurable by the client configuration data.

12. The system of claim 11, wherein the group of hardware components is one of multiple groups of hardware component; and
wherein each group of the multiple groups includes a different model, manufacturer, version, or a type of hardware component as compared to a different one of the multiple groups.

13. The system of claim 12, wherein the type of hardware component is a programmable logic device or a clock generator.

14. The system of claim 6, wherein the hardware component configuration circuit is further configured to configure the hardware component to operate at the clock rate based on an environmental factor of the hardware component.

15. The system of claim 14, wherein the environmental factor includes a location of the hardware component within a computer infrastructure, a temperature of the hardware component, a capacity of a device to cool the hardware component, or an amount of power available to the hardware component.

16. A method, comprising:
selecting, from sets of client configuration data, a set of client configuration data for configuring programmable logic hardware to implement a client logic circuit, wherein the programmable logic hardware is coupled to a client machine of a host computer infrastructure, wherein each of the sets of client configuration data is associated with respective corresponding clock information in a logic repository that stores the sets of client configuration data and corresponding manifests that include the clock information, wherein the sets of client configuration data represent sets of logic circuits to be implemented;
configuring the programmable logic hardware according to the set of client configuration data;
determining a clock rate that the programmable logic hardware operates at when configured according to the set of client configuration data based on selecting a clock configuration from a plurality of clock configurations for the programmable logic hardware included in the clock information corresponding to the set of client configuration data; and
storing a value related to the clock rate at a register to dynamically update a clock rate of the programmable logic hardware during runtime.

17. The method of claim 16, further comprising:
determining clock rates that the programmable logic hardware operates at based on the clock information corresponding to two of the sets of client configuration data.

18. The method of claim 17, further comprising determining a clock rate of the programmable logic hardware to implement the set of client configuration data; and
generating, based on the clock rate, the clock information corresponding to the set of client configuration data, wherein generating the clock information includes transforming the clock rate to a value readable by a hardware component to operate at the clock rate, wherein the hardware component includes the programmable logic hardware.

19. The method of claim 18, further comprising writing the transformed clock rate, to a register of the hardware component.

20. The method of claim 18, wherein the clock information is generated to configure the hardware component to operate at two clock rates concurrently, wherein the two clock rates include the clock rate.

21. The system of claim 6, wherein the clock information maps the plurality of clock configurations to a plurality of environmental factors; and
wherein the hardware component configuration circuit is configured to:
identify an environmental factor from the plurality of environmental factors that matches with an environmental factor of the hardware component;
select, from the plurality of clock configurations and based on the identified environmental factor, the clock configuration; and
configure, based on the selected clock configuration, the clock rate of the hardware component.

22. The system of claim 21, wherein each of the plurality of clock configurations includes a clock offset.

23. The system of claim 21, wherein the plurality of environmental factors includes a thermal output threshold of the client configurable logic circuit; and
wherein the hardware component configuration circuit is configured to update the clock rate based on the clock information and based on a thermal output of the client configurable logic circuit exceeding the thermal output threshold.

24. The system of claim 21, wherein the environmental factors include a thermal output threshold of the system; and
wherein the hardware component configuration circuit is configured to update the clock rate based on the clock information and based on a thermal output of the system exceeding the thermal output threshold.

25. The system of claim 6, wherein the clock information maps the plurality of clock configurations to a plurality of performance targets; and wherein the hardware component configuration circuit is configured to:
  identify a performance target from the plurality of performance targets that matches with a performance target of the hardware component;
  select, from the plurality of clock configurations and based on the identified performance target, the clock configuration; and
  configure, based on the selected clock configuration, the clock rate of the hardware component.

26. The system of claim 1, wherein the manifest includes an identifier of the peripheral device.

27. The system of claim 1, wherein the manifest includes information to verify the corresponding client configuration data, the information comprising at least one of: a checksum of the corresponding client configuration data, or a signature of the corresponding client configuration data.

28. The system of claim 6, wherein the clock configuration is selected from the plurality of clock configurations based on at least one of a performance target or an environmental factor of the hardware component.

29. The system of claim 6, wherein the logic repository comprises a memory; and
  wherein each of the manifests stored in the memory indicates a memory location of the corresponding client configuration data in the memory.

30. The system of claim 6, wherein each of the manifests includes multiple fields defined according to a template; and
  wherein the clock information are included in one or more of the multiple fields of the corresponding manifest of the client configuration data.

* * * * *